(12) United States Patent
Peng et al.

(10) Patent No.: US 8,591,641 B2
(45) Date of Patent: Nov. 26, 2013

(54) WEATHER-RESISTANT DYE AND USE THEREOF

(75) Inventors: Xiaojun Peng, Zhuhai (CN); Jianzhou Zhang, Zhuhai (CN); Fan Jiangli, Dalian (CN); Shiguo Sun, Dalian (CN); Rong Zhang, Zhuhai (CN)

(73) Assignees: Dalian University of Technology, Dalian (CN); Ninestar Management Co., Ltd., Zhuhai (CN)

( * ) Notice: Subject to any disclaimer, the term of this patent is extended or adjusted under 35 U.S.C. 154(b) by 310 days.

(21) Appl. No.: 12/992,247

(22) PCT Filed: Apr. 30, 2009

(86) PCT No.: PCT/CN2009/071583
§ 371 (c)(1),
(2), (4) Date: Mar. 17, 2011

(87) PCT Pub. No.: WO2009/138010
PCT Pub. Date: Nov. 19, 2009

(65) Prior Publication Data
US 2011/0168053 A1      Jul. 14, 2011

(30) Foreign Application Priority Data

May 13, 2008   (CN) .......................... 2008 1 0028003

(51) Int. Cl.
*C09D 11/02* (2006.01)
*C09B 47/04* (2006.01)

(52) U.S. Cl.
USPC ...................................... 106/31.49; 540/133

(58) Field of Classification Search
USPC ......... 106/31.27, 31.47, 31.49; 540/126, 132, 540/133
See application file for complete search history.

(56) References Cited

U.S. PATENT DOCUMENTS

| | | | |
|---|---|---|---|
| 4,634,555 A | 1/1987 | Baxter et al. | |
| 7,160,372 B2 * | 1/2007 | Yoshizawa et al. | 106/31.47 |
| 7,226,498 B2 * | 6/2007 | Yamashita et al. | 106/31.5 |
| 7,419,537 B2 | 9/2008 | Fujii et al. | |
| 7,575,626 B2 | 8/2009 | Patel | |
| 7,575,627 B2 * | 8/2009 | Patel | 106/31.47 |
| 7,922,799 B2 * | 4/2011 | Patel | 106/31.49 |

FOREIGN PATENT DOCUMENTS

| | | |
|---|---|---|
| CN | 1768116 A | 5/2006 |
| CN | 101076569 A | 11/2007 |
| JP | 2004-277456 | 7/2004 |
| WO | 2007116203 | 10/2007 |

* cited by examiner

*Primary Examiner* — Helene Klemanski
(74) *Attorney, Agent, or Firm* — Jackson IPG PLLC

(57) ABSTRACT

The invention is related to a weather-resistant dye and use thereof, which contains in molecules thereof not only chromophoric parent D, but also electron-accepting group Q which is linked with dye parent D through non-conjugated carbon link L to constitute D-L-Q dye molecule; the electron-accepting group Q has such a HOMO energy level that is lower than the HOMO energy level of the dye chromophoric parent D. The dye has sun-resistance and anti-ozone performances, which can be used as colorant in the ink, dope, lacquer, toner powder for laser printing, marker, paper, fabric, glass, porcelain or polymer.

8 Claims, No Drawings

WEATHER-RESISTANT DYE AND USE THEREOF

CROSS-REFERENCE TO RELATED APPLICATIONS

This patent application is a national phase application of PCT/CN2009/071583 filed on Apr. 30, 2009, which claims priority of China patent application 200810028003.0 filed on May 13, 2008.

STATEMENT REGARDING FEDERALLY SPONSORED RESEARCH OR DEVELOPMENT

Not Applicable

TECHNICAL FIELD

The invention is related to a weather-resistant dye and use thereof, particularly a novel weather-resistant dye and use thereof in ink, dope, lacquer, marker, toner powder for laser printing and the like.

BACKGROUND OF INVENTION

As it is commonly known, dye is used in many fields. In traditional industries, dye is used for ink, dope, lacquer, marker and the like, such as ink, coating ink, dope for outdoor and indoor use, and various color lacquer and the like. In recent years, with the application of computer and digital technology, the material for digital-designed color data recording has gradually replaced traditional technology and boomed rapidly. Dye is increasingly used in the inkjet ink and laser ink.

As colorant compared to paint, dye has much better water-solubility, color emissivity and color saturation, so has relatively wider applications. However, dye has many disadvantages per se, here is worse weather-resistance. For example, the light-resistance and gas-resistance thereof are worse than paint, which makes quality of the formed images susceptible to degradation. Specifically, the dye is susceptible to degradation under light, for example, UV, visible light, and is susceptible to degradation under the effect of oxidizing gases in the air such as ozone, $NO_x$, $SO_x$, $H_2S$, which means it has poor light-resistance and gas-resistance. Even if not illuminated by intensive light, color change will happen by contact with air and indoor light when stored indoors for a long time, which causes poor stability.

In recent years, we have carried out much study on the weather-resistance especially the light-resistance and gas-resistance of dye, which is generally classified into two methods: develop and select novel weather-resistant dye, such dye may have special structure or have the required weather-resistance; Another method is to add functional additive to improve the light-resistance of dye. The second method is simple and easy to apply, while is only a solution to the symptoms but not getting to the root of the problems, and the adding of the additive will also cause new problem. The first method can get to the root of the weather-resistance problem, hence much work has been done with study on development of novel weather-resistant dye and much progress has been made.

The U.S. Pat. No. 5,948,154 submitted in 1996 has proposed a yellow ink composition, which adopts composition of yellow dyes with the general formulas (XI) and (XII). For yellow dyes, the known C.I. acid yellow 17 and 23 have super water-solubility but poor water-resistance. C.I. direct yellow 86, 100 and 142 have excellent light-resistance but are susceptible to jammed inkjet head. However, the yellow ink composition of the patent not only has excellent light-resistance and water-solubility, but also has storage stability, no jammed inkjet head.

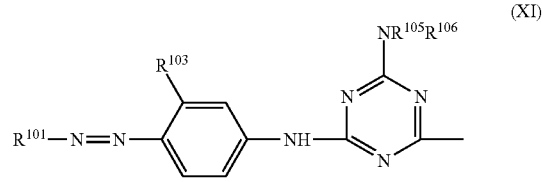

(XI)

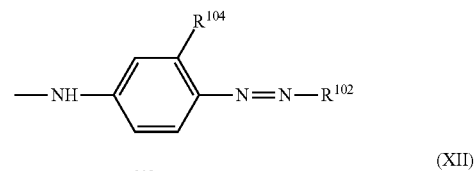

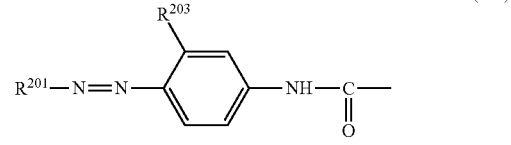

(XII)

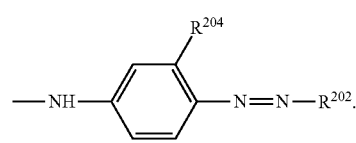

The Chinese patent application applied in October, 2002 (application No. 02147082.0) has disclosed a black water-based ink composition suitable for outdoor print, which has excellent light-resistance, gas-resistance and storage stability, and can form high-quality image. The ink composition selects tri-azolo type dye as black colorant, selected from compounds of formula (I). It is a novel tri-azolo type dye, and has better storage stability when M in the formula is organic ammonium.

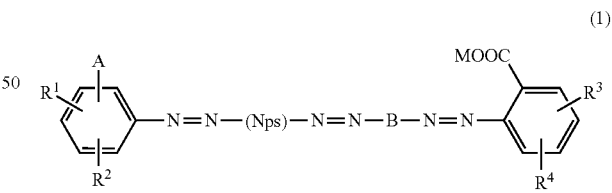

(1)

The U.S. Pat. No. 6,852,154B2 applied in April, 2003 has disclosed a magenta prinking ink composition, which uses the dye of following formula (I) or salt thereof as magenta colorant to improve light-resistance. The ink can be used in combination with yellow and cyan ink. The patent has also disclosed an ink composition comprising two types of magenta inks with different color density, wherein the dye of formula (I) was used in the low-density magenta ink. The ink composition can form non-particulate image. The ink preferably also comprises non-ion surfactant, preferred alkynediols surfactant and penetration promoter and preferred glycol ether.

(1)

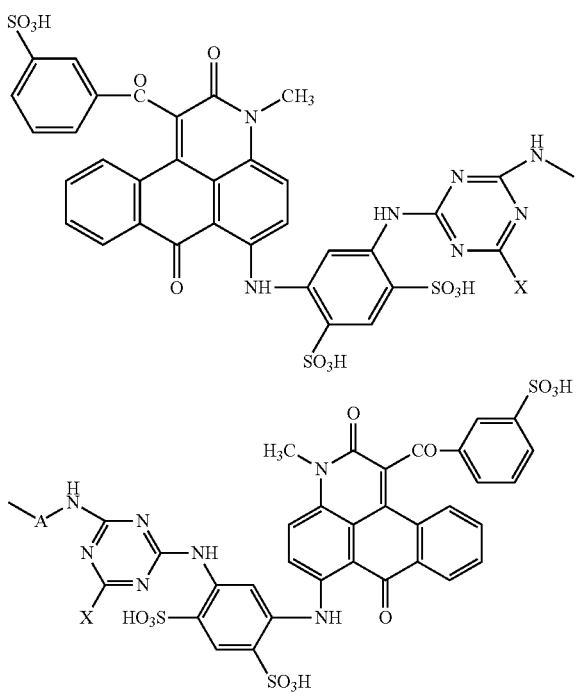

The Chinese patent application applied in September, 2004 (application No. 200480035102.1) has proposed an ink, which uses following formula as magenta dye, the compound of formula (1) has the function of improving light-resistance fastness and gas-resistance fastness. Such compounds can be used either separately in one type or in combination of several types. Meanwhile, by adding carboxyl aryl compound and/or salt thereof into the ink, light-resistance, gas-resistance, anti jam and wet-resistance can be simultaneously obtained. Especially when using lithium salt thereof, remarkably excellent anti-jam performance can be obtained

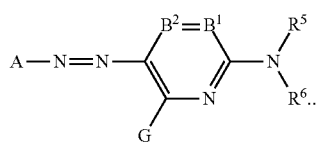

Although these progresses in study have been made, the novel weather-resistant dye with better weather-resistance is still in demand in this industry.

BRIEF DESCRIPTION OF THE INVENTION

To overcome the disadvantages of bad weather-resistance particularly the bad light-resistance and gas-resistance of dye in existing technology, the invention provides a novel weather-resistant dye with novel structure.

The molecular structure of the dye of the invention is D-L-Q, which comprises dye chromophoric group D, electron-accepting group Q and non-conjugated linking group L linking D and A. Q has lower HOMO (highest orbit of electron occupation) energy level, which has a value lower than the HOMO energy level of the dye chromophoric group D. So, when the dye is excited under light or ozone effect to be activated, the rapid transfer of electron from D to Q inside molecule will occur, so as to quench the excited or activated state of the dye before it would begin to fade, which gives the dye improved weather-resistance including high light-resistance and gas-resistance, such as high performance of ozone-resistance. Then this transferred electron is transmitted to medium, so as to return the dye to the initial state.

The dye of the invention has not only unexpectedly good weather-resistance when used outdoors, but also durable stability and suitability for long-term storage when used indoors. The dye has durable color stability so as not to be susceptible to fade no matter it is exposed to air or light after use or in the storage period before use.

In the first aspect of the invention, it is related to a dye, which contains in molecules thereof not only the chromophoric parent D but also electron-accepting group Q which is linked with dye parent D through non-conjugated carbon link L to constitute D-L-Q dye molecule; the electron-accepting group Q has such a HOMO energy level that is lower than the HOMO energy level of the dye parent D.

Said dye of the invention includes cyan dye, the said cyan dye comprises compound of general formula I or mixture thereof:

I

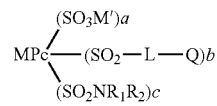

Wherein Mpc is chromophoric parent group D as phthalocyanine parent, L is the non-conjugated linking group, Q is the electron-accepting group, the HOMO energy level of Q is lower than the HOMO energy of dye chromophoric parent D;

In the general formula I, a and c are same or different integers of 0-3, b is integer of 1-4, the sum of a+b+c is 2-4;

M in the Mpc parent is hydrogen atom, metal atom or the oxide, hydroxyl compound or halide thereof, Pc is phthalocyanine parent ring, $R_1$ and $R_2$ are same or different H, alkyl of $C_{1-18}$, aryl of $C_{6-12}$, phenyl or naphthyl with substituent A or $(CR_3R_4)_nA$, $R_3$ and $R_4$ are same or different H, alkyl of $C_{1-4}$; A is H, OH, $NH_2$, $CO_2M''$ or $SO_3M''$, n is 0-18;

M' and M'' are same or different H, metal ion, ammonium salt or organic ammonium salt;

L is selected from $-NR_3(CR_4R_5)_mNR_6-$, $-NR_3(CR_4R_5)_m-$, $-S(CR_4R_5)_pS-$ or $-(CR_4R_5)_q-$, wherein $R_5$ and $R_6$ are same or different H, alkyl of $C_{1-14}$; m, p and q are same or different integers 1-4;

Q has general formula $Q_1$ or $Q_2$:

$Q_1$

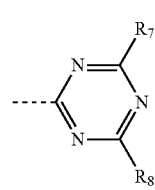

-continued

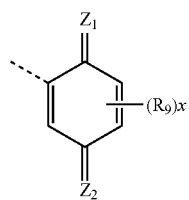

wherein $R_7$ and $R_8$ are same or different F, Cl, Br, OH, $NH_2$, NHCN, $NHCONH_2$, $NH(CR_3R_4)_nA$, $N((CR_3R_4)_nA)_2$, $NR_3A_2$, SH or $S(CR_3R_4)_nA_2$; $A_2$ is phenyl or naphthyl with 1-5 substituents $A_3$; $A_3$ is selected from H, Cl, Br, CN, $CF_3$, $CH_3$, $NO_2$, $NH_2$, $SO_3M''$, $CO_2M''$, $PO_3M''_2$ or $PO_3HM''$;

$R_9$ is H, Cl, Br, CN, $CF_3$, $CH_3$, $SO_3M''$ or $CO_2M''$;

x is integer of 0-3;

$Z_1$ and $Z_2$ are same or different O or $C(CN)_2$.

In a preferred embodiment of the aforementioned dye, M' and M'' are same or different, which are selected from Na, K, $L_1$, $NH_4$, $N(CH_3)_4$, $NH(CH_3)_3$, $NH_2(CH_3)_2$, $NH_3(CH_3)_4$, $NH(CH_2CH_2OH)_3$, $NH_2(CH_2CH_2OH)_2$ or $NH_3CH_2CH_2OH$.

In a preferred embodiment of the aforementioned dye or cyan dye of the invention, the difference of HOMO energy level value between the said group Q and dye chromophoric parent D≥0.1.

In a preferred embodiment of the cyan dye of the invention, said MPc is copper phthalocyanine with general formula III:

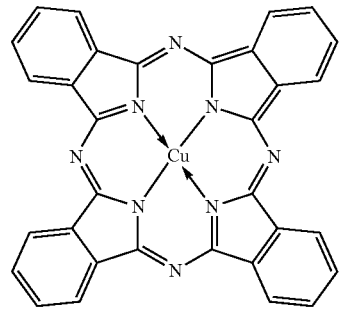

III

In a preferred embodiment of the cyan dye of the invention, said L group is $—NR_3(CR_4R_5)_mNR_6—$, said Q has general formula $Q_2$.

In a preferred embodiment of the cyan dye of the invention, said L group is $—NR_3(CR_4R_5)mNR_6—$, $—S(CR_4R_5)_pS—$ or $—(CR_4R_5)_q—$, said Q group is $Q_1$ or $Q_2$.

In a preferred embodiment of the cyan dye of the invention, said general formula L compound is the compound of general formula IV or general formula V:

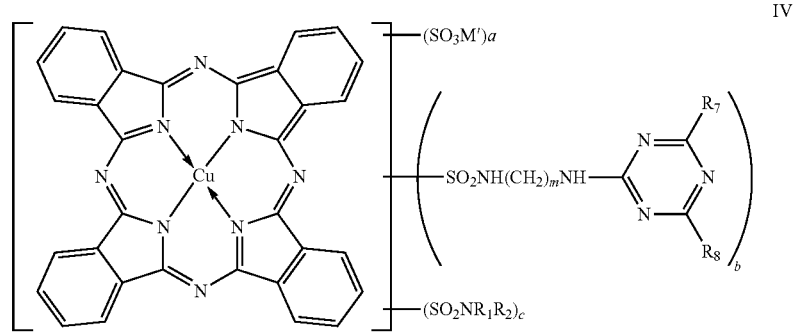

IV

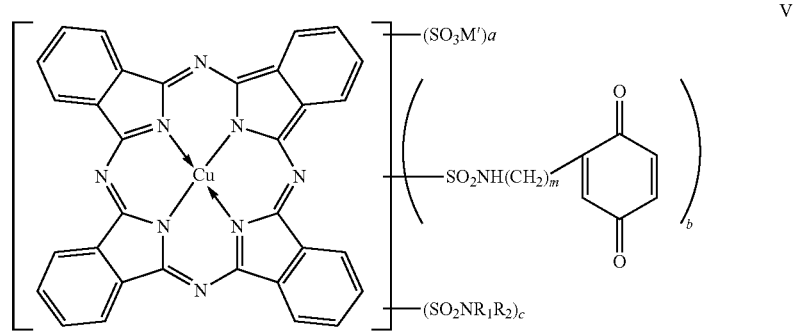

V

In the general formulas IV and V, groups M', $R_7$, $R_8$, $R_1$, $R_2$, a, b, c, m are defined same as above.

In the second aspect of the invention, it is related to an ink, comprising the aforementioned dye or cyan dye of the invention.

In a preferred embodiment of the invention, the said ink is press ink, coating ink or inkjet ink. The said inkjet ink is preferably water-based inkjet ink, also preferably solvent-based inkjet ink.

In the third aspect of the invention, it is related to an inkjet water-based ink composition comprising: 1-20 weight percent of the dye as claimed in claim 2, 5-50 weight percent of the organic solvent miscible with water and 30-94 weight percent of water, based on total weight of the composition In a preferred embodiment, the said organic solvent miscible with water is selected from the following one or more than one of: ethanol, propanol, isopropano, ethylene glycol, diethylene glycol, triethylene glycol, glycerol, diethylene glycol monobuthyl ether, diethylene glycol monobuthyl ether, triethylene glycol monobuthyl ether, propylene glycol, butanediol, pentanediol, hexanediol, diglycerol, 2-pyrrolidone and N-dimethyl-2-pyrrolidinone.

In the fourth aspect of the invention, it is related to a dope comprising the aforementioned dye or cyan dye of the invention. The dope is preferably outdoor-used dope. In the fifth aspect of the invention, it is related to a lacquer comprising the aforementioned dye or cyan dye of the invention. The lacquer is preferably outdoor-used lacquer.

In the sixth aspect of the invention, it is related to a toner powder for laser printing comprising the aforementioned dye or cyan dye of the invention.

In the seventh aspect of the invention, it is related to a marker comprising the aforementioned dye or cyan dye of the invention.

In the eighth aspect of the invention, it is related to use of the said dye of the invention, which is used as colorant in the following materials: ink, dope, lacquer, toner powder for laser printing or marker.

In the ninth aspect of the invention, it is related to use of the said dye of the invention, which is used as colorant in the following materials: paper, fabric, glass, porcelain or polymer. Wherein the said fabric is preferably selected from: woven fabric, knitwear, non-woven fabric. The said polymer material is preferably selected from: rubber, plastic or fiber.

EMBODIMENT

The key of the invention is that the dye molecule (D-L-Q) contains dye chromophoric group (D), electron-accepting group Q and non-conjugated linking group L linking D and A, Q has lower energy level of highest occupied molecular orbital, i.e. HOMO energy level, which has a value lower than the HOMO energy level of the dye chromophoric parent MPc. So, when the dye is activated under light or ozone effect, the rapid transfer of electron from D to Q inside molecule will occur, so as to quench the excited or activated state of the dye before it would begin to fade, which gives the dye improved light-resistance and ozone-resistance. Then this transferred electron is transmitted to medium, so as to return the dye to the initial state.

HOMO energy level has been specifically described in many monographs and documents, such as C. J. Cramer, Essentials of Computational Chemistry, John Wiley & Sons Ltd. After the organic molecules of dye absorb light of proper wavelength, one electron on the HOMO energy level in the dye molecule will obtain energy to leap in immigration to LUMO (lowest unoccupied molecular orbital) energy level, the dye molecule will be excited and activated. At this time, the dye molecule is very susceptible to decomposition reaction or chemical reaction with other molecules such as oxygen (or ozone), causing the original molecule break or fade. If there is electron donator group existing inside the dye molecule at this time, one electron in the HOMO energy level of donator group will transfer to the HOMO energy level of vacant dye parent molecule. Because the electron transfer inside the molecule is much faster than that among the molecules, so introduction of electron donator group into molecule can cause rapid occurrence of electron transfer, which is named as light-induced electron transfer inside the molecule (PET).

In another aspect, if there is electron acceptor of very low energy level inside the molecule, then the excited electron will rapidly fall back to this electron acceptor, that is, the electron falls from LUMO energy level of the dye back to the HOMO energy level of the electron acceptor, causing rapid quenching of dye molecule activator. This is a process reverse to the direction of the aforementioned electron transfer, named as reverse-PET.

The key to achieve this reverse-PET is the HOMO energy level of the electron-accepting group should be lower than the HOMO energy level of the dye parent. Based on this, the inventor accomplished the invention.

There are many methods for computing HOMO energy level, with reference to C. J. Cramer, Essentials of Computational Chemistry, John Wiley & Sons Ltd, 2002; Tetsuo Nagano and et al, J. Am. Chem. Soc. 2004, 3357-3367), also some commercial computing software, such as Gaussian 98, Gaussian 2003 and so on(Gaussian, Inc. 340 Quinnipiac St Bldg 40 Wallingford, Conn. 06492 USA), the most commonly used program such as B3LYP/6-31G*(Gaussian).

By application of the aforementioned relevant program (B3LYP/6-31G*), the inventor computes to get the HOMO energy level of the typical dye parent which can be used for the invention as below:

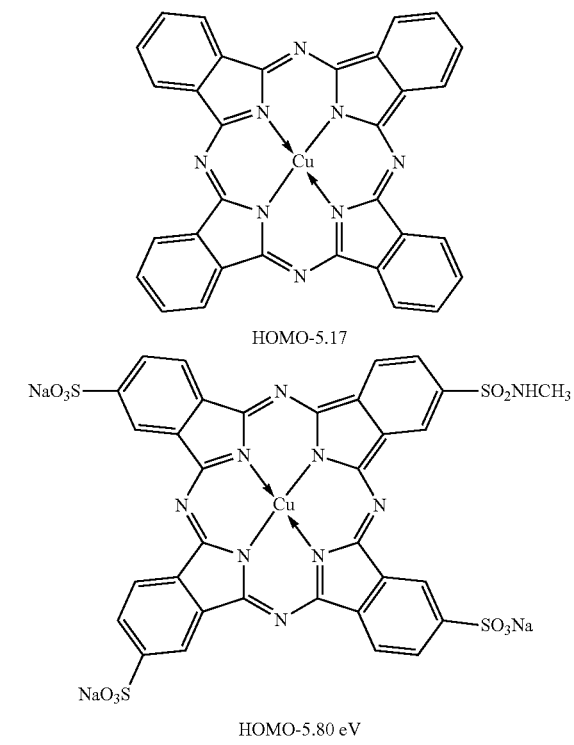

HOMO-5.17

HOMO-5.80 eV

By application of the same program, the inventor computes to get the HOMO energy level values of a part of the electron acceptor Q group of the invention as below:

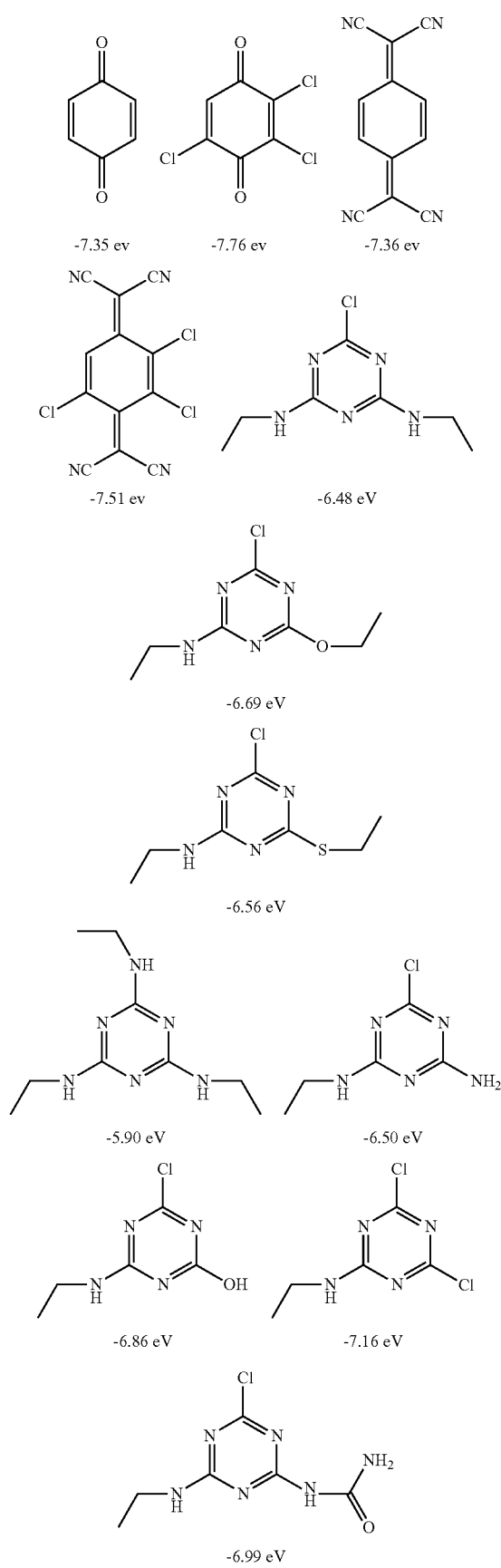

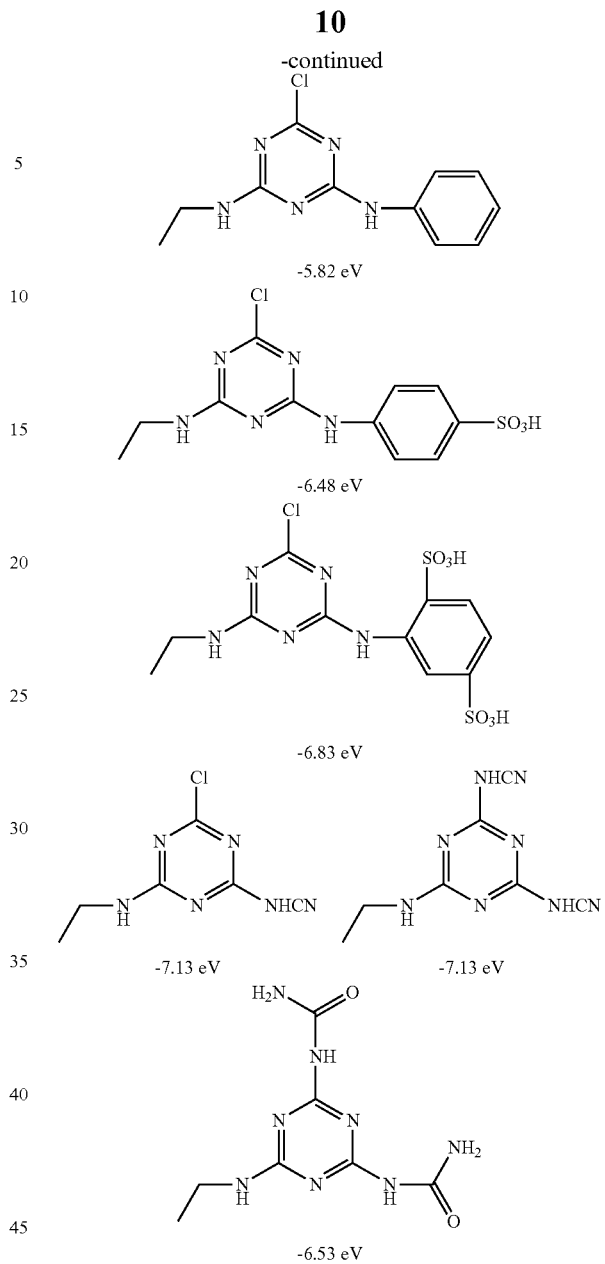

According to the theory of electron transfer energy, the lower the HOMO energy level value of electron acceptor group Q is compared to the HOMO energy level value of dye parent (such as −5.17), the bigger the pushing force of electron transfer is, hence it is easier to accept electron. It can be seen from aforementioned computing results, $Q_1$ and $Q_2$ with electron-absorbing group are excellent electron acceptor, especially two electron acceptors with difference over 0.1 eV, or preferably difference of 0.2, more preferably difference over 0.3 will have significant effect.

By connecting these electron acceptors (Q) into phthalocyanine dye parent MPc molecules through various known methods of chemical synthesis, we get sun-resistant and anti-ozone dye of the invention.

The dye suitable for invention can be such dye as: the electron Q can be connected onto the dye parent through L group, the HOMO energy level of the said Q is lower than the HOMO energy level of the dye chromophoric parent D. The said dye includes cyan dye, yellow dye, magenta dye, black dye and so on. Preferably it is cyan dye.

For the cyan dye, preferably it is phthalocyanine cyan dye of formula I. In formula I, M in MPc phthalocyanine parent is preferably hydrogen atom, metal atom or oxide, hydroxyl compound or halide thereof, Pc is phthalocyanine parent ring, wherein M is preferably hydrogen atom or metal atom. The said metal atom is selected from: Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, and so on. Preferably it is copper, nickel, zinc or aluminium, more preferably it is copper.

In the cyan dye of formula I of the invention, $-SO_3M'$ group contributes to the water solubility. a is integer or fraction of 0-3, including two end points. The bigger is the value of a, the better is the water solubility. a is preferably 1-3, more preferably 1-2.

M' is H, metal ion, ammonium salt or organic ammonium salt. It is preferably H, Na, K, $L_1$, $NH_4$, $N(CH_3)_4$, $NH(CH_3)_3$, $NH_2(CH_3)_2$, $NH_3(CH_3)_4$, $NH(CH_2CH_2OH)_3$, $NH_2(CH_2CH_2OH)_2$ or $NH_3CH_2CH_2OH$. More preferably it is H, Na, Li, $N(CH_3)_4$, $NH(CH_2CH_2OH)_3$, $NH_2(CH_2CH_2OH)_2$ or $NH_3CH_2CH_2OH$.

$-SO_2NR_1R_2$ group contributes to the water solubility and weather-resistance of the dye. c is integer or fraction of 0-3, including two end points. It is preferably 1-3. The bigger is the value of C, the greater is $-SO_2NR_1R_2$'s contribution to the water solubility and weather-resistance of the dye.

$R_1$ and $R_2$ are same or different H, alkyl of $C_{1-18}$, aryl of $C_{6-12}$, phenyl or naphthyl with substituent A or $(CR_3R_4)_nA$; wherein $R_3$ and $R_4$ are same or different H, alkyl of $C_{1-4}$; A is H, OH, $NH_2$, $CO_2M''$ or $SO_3M''$, n is 0-18. n is preferably 0-10, more preferably 0-6, further preferably 1-4. The smaller is the value of n, the better is the water solubility of the dye. Alkyl of $C_{1-18}$ is preferably alkyl of $C_{1-16}$, more preferably alkyl of $C_{1-10}$, further preferably alkyl of $C_{1-6}$, further preferably alkyl of $C_{1-4}$. The lower is atom number of alkyl C, the better is the water solubility of the dye. When $R_1$ and $R_2$ are aryl of $C_{6-12}$ with phenyl or naphthyl of substituent A, water solubility of the dye degrades, while water solubility of solvent improves. M" is H, metal ion, ammonium salt or organic ammonium salt. M' and M" may be same or different. M" is preferably H, Na, K, $L_1$, $NH_4$, $N(CH_3)_4$, $NH(CH_3)_3$, $NH_2(CH_3)_2$, $NH_3(CH_3)_4$, $NH(CH_2CH_2OH)_3$, $NH_2(CH_2CH_2OH)_2$ or $NH_3CH_2CH_2OH$. More preferably are preferably H, Na, Li, $N(CH_3)_4$, $NH(CH_2CH_2OH)_3$, $NH_2(CH_2CH_2OH)_2$ or $NH_3CH_2CH_2OH$.

$-SO_2-L-Q$ group is main group for improving weather-resistance, b is integer or fraction of 1-4, including two end points. The bigger is value of b, the better is weather-resistance of the dye.

When the dye of the invention is single said compound, a, b and c are integers. When the dye is the mixture of the said compounds of the invention, a, b and c can be either integers or fractions. In the invention, the total of a+b+c is 2-4.

L is non-conjugated flexible chain, at least containing 1 carbon atom. For too long carbon atom link would reduce the efficiency of electron transfer, it preferably contains up to 44 carbon atoms, more preferably up to 40 carbon atoms, further preferably up to 36 carbon atoms, further preferably contains up to 27 carbon atoms, further preferably not more than 18 carbon atoms in L, further preferably not more than 12 carbon atoms, further preferably not more than 8 carbon atoms. Further preferably contain up to 6 carbon atoms, further preferably up to 4 carbon atoms, further preferably up to 1-3 carbon atoms.

L is selected from $-NR_3(CR_4R_5)mNR_6-$, $-NR_3(CR_4R_5)_m-$, $-S(CR_4R_5)_pS-$ or $-(CR_4R_5)_q-$, wherein $R_5$ and $R_6$ are same or different H, alkyl of $C_{14}$; m, p and q are same or different integers or fractions in the range of 1-4, including two end points, it is preferably 1-3, more preferably integers or fractions in the range of 1-2.

When the dye of the invention is single said compound, m, p and q are same or different integers. When dye is the mixture of the said compounds, m, p and q can be either integers or fractions.

When L takes $-NR_3(CR_4R_5)_mNR_6-$, Q can be either $Q_1$ or $Q_2$. When L takes $-NR_3(CR_4R_5)_m-$, Q can be either $Q_1$ or $Q_2$ optionally. When L takes $-S(CR_4R_5)_pS-$ or $-(CR_4R_5)_q-$, Q can be either $Q_1$ or $Q_2$ optionally.

In a preferred embodiment, when L takes $-NR_3(CR_4R_5)_mNR_6$, Q is $Q_1$.

In another preferred embodiment, when L takes $-NR_3(CR_4R_5)_mNR_6$, Q is $Q_2$.

In a further preferred embodiment, when L takes $-NR_3(CR_4R_5)_m-$, Q is selected to be $Q_1$ or $Q_2$.

In a further preferred embodiment, when L takes $-S(CR_4R_5)_pS-$ or $-(CR_4R_5)_q-$, Q is selected to be $Q_1$ or $Q_2$.

The Q of this invention has general formula $Q_1$ or $Q_2$:

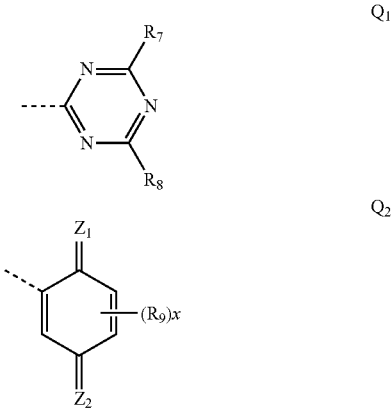

Wherein $R_1$ and $R_2$ are same or different, selected from: F, Cl, Br, OH, $NH_2$, NHCN, $NHCONH_2$, $NH(CR_3R_4)_nA$, $N((CR_3R_4)_nA)_2$, $NR_3A_2$, SH or $S(CR_3R_4)_nA_2$. It is preferably F, Cl, Br, $NH_2$, NHCN, $NHCONH_2$ or SH. A is defined same as above.

$A_2$ is phenyl or naphthyl with 1-5 substituents $A_3$, preferably with 1-3 substituents $A_3$, more preferably with 1-2 substituents $A_3$; $A_3$ is selected from H, Cl, Br, CN, $CF_3$, $CH_3$, $NO_2$, $NH_2$, $SO_3M''$, $CO_2M''$, $PO_3M''_2$ or $PO_3HM''$; preferably selected from H, Cl, Br, CN, $CF_3$, $CH_3$, $NH_2$, $SO_3M''$ or $PO_3M''$. M" is defined same as above.

$R_9$ is H, Cl, Br, CN, $CF_3$, $CH_3$, $SO_3M''$ or $CO_2M''$; preferably H, Cl, Br, CN, $CF_3$, $CH_3$ or $SO_3M''$.

x is integer of 0-3, preferably 0-2, more preferably 0-1.

$Z_1$ and $Z_2$ are respectively same or different O or $C(CN)_2$.

The synthesis of dye of the invention uses traditional method of organic synthesis, especially method of dye synthesis.

The synthesis of D-L-Q can use conventional method of organic synthesis. As for synthesis strategy, firstly can separately synthesize to get D, Q with reactive group, then make connection by L with reactive group; also can start from D to connect L and Q in sequence; also can start from Q to connect L and D in sequence.

Take the copper phthalocyanine (CuPc) cyan dye as example, firstly can chlorosulfonate or introduce reactive sulfone chloride to make copper phthalocyanine react with chlorosulfonic acid of different molecular ratios, also can make copper phthalocyanine react with chlorosulfonate of different molecular ratios added with thioyl chloride, phosphorus trichloride, phosphorus oxychloride, phosphorus pentachloride, hosgene of different molecular ratios, and so on. Also can make sulfonated phthalocyanine react with thioyl chloride, phosphorus trichloride, phosphorus oxychloride, phosphorus pentachloride, hosgene of different molecular ratios, and so on, to form phthalocyanine sulfuryl chloride 1.

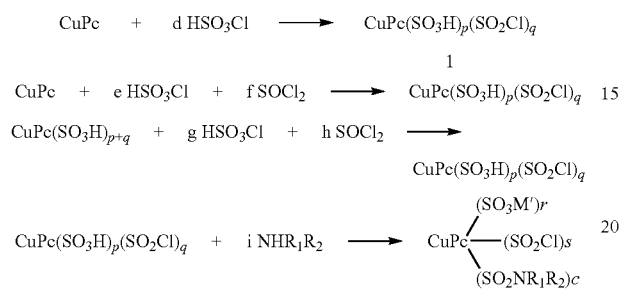

The aforementioned molecular ratios d, e, f can be adjusted according to the requirements of p, q, while p and q are ascertained according to the requirements of a, b, c in the objective product. Wherein d is 1-500, integer or with decimal fraction; e, f, g, h is 0-500, same or different, integer or with decimal fraction.

Phthalocyanine sulfuryl chloride 1 can firstly react with $NHR_1R_2$ under the effect of alkaline agent M'OH, to form intermediate 2:

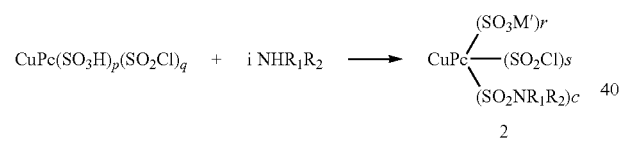

Wherein i, r, s can be regulated according to the requirements of a, b.

Intermediate 2 further reacts with connection group (such as $NHR_3(CR_4R_5)_mN$ or $R_6$) with reactive group to form intermediate 3, then intermediate 3 react with Q of active group to form D-L-Q dye 4.

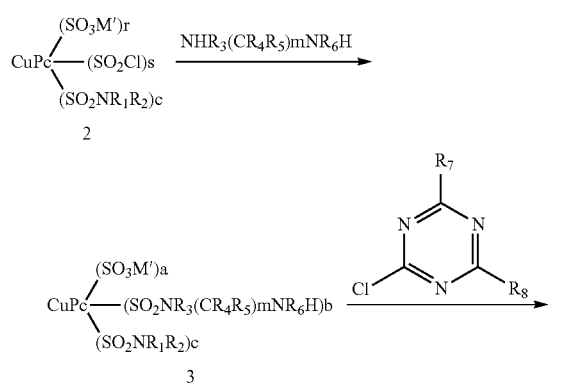

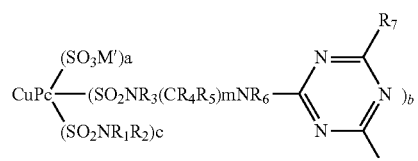

Dye 4 also can be resulted from the reaction of intermediate 2 with L-Q system 5 with active group:

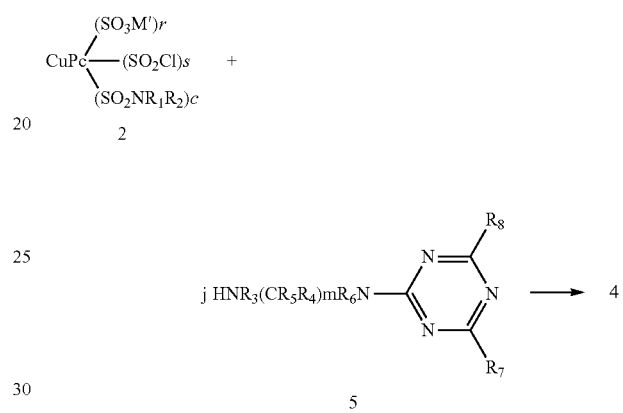

Wherein j is adjusted according to the requirement of b.

Dye 4' containing benzoquinone-type electron acceptor Q also can be resulted from the reaction of intermediate 2 with L-Q system 5' with active group:

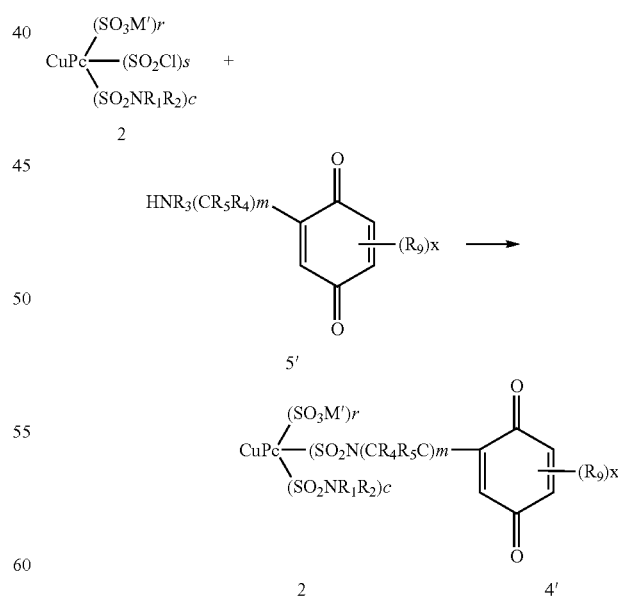

According to the requirement of the synthesis process, firstly can introduce L-Q into the dye molecules to form 6 or 6' intermediate, then react with $NHR_1R_2$ to form final dye 4 or 4' as alkaline agent such as M'OH, organic amine exists.

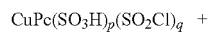

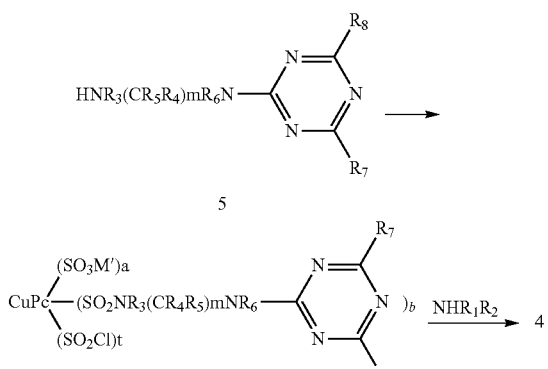

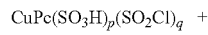

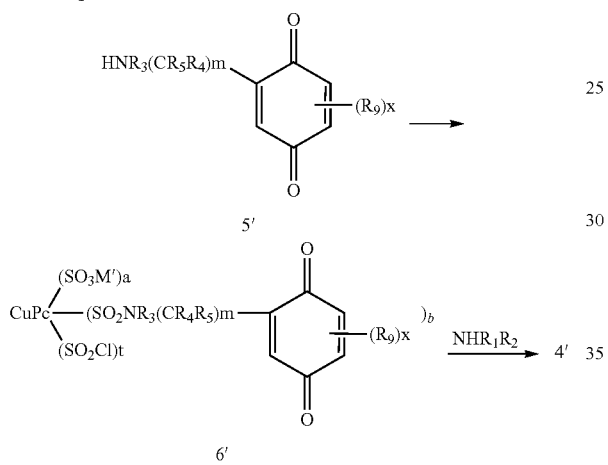

Wherein t is regulated according to the requirement of c.

The regulation of cation M', M" can be achieved through: adding alkaline agent such as M'OH, M"OH, organic amine, and so on, in reaction; or aciding out the dye after it is formed, followed by neutralizing and dissolving with M'OH, organic amine.

The product synthesized as above is generally mixture, a, b, c in the general formula I can be integer or fraction, which is average of the group. But for a single pure compound, they are integers. In practical application, the dye can be mixture or pure compound.

The separation of mixture and purification of single compound can use conventional separation method, such as step salting out, step aciding out to control acidity.

In addition, the inorganic salt in the synthesized dye need to be excluded from the dye, with general method such as ion exchange, high-pressure reverse osmosis, and so on.

The dye of the invention can form bright color, especially cyan dye of the invention as one tricolor, which can be either used through being built up with a variety of other cyan dyes or built up with dyes of other colors to form various required colors, such as overlay with yellow dye to form green, form blue with fuchsin color, being made up with yellow, fuchsin dyes into black, and so on.

The dye in the invention can be widely used in various occasions with requirements for weather-resistance. For example, used for outdoor weather-resistant ink, dope, lacquer, marker, toner powder for laser printing, used as colorant. The said ink includes press ink, coating ink or inkjet ink, and so on. The inkjet ink can be water-based inkjet ink or solvent-based inkjet ink.

It can be used in various outdoor-used materials, used as colorant to give the material durable color retention so as not to be susceptible to fade. The said material includes but not limited to: paper, fabric, glass, porcelain or polymer. The said fabric includes woven fabric, knitwear or non-woven fabric, the said polymer includes plastic, rubber or fiber, and so on.

In addition, the dye of the invention has not only unexpectedly good weather-resistance when used outdoors, but also durable stability and suitability for long-term storage when used indoors. The dye has durable color stability so as not to be susceptible to fade no matter it is exposed to air or light after use or in the storage period before use.

When it used indoors, it can be used as colorant in the aforementioned ink, dope, lacquer, marker, toner powder for laser printing and various materials, to provide the aforementioned ink, dope, lacquer, marker, toner powder for laser printing and various materials with such unexpectedly color stability as to be insusceptible to fade in long-term storage. For example, if it is prepared with other auxiliaries into inkjet ink, when the ink is in the storage period before application, it has durable color stability so as not to be susceptible to fade even it is exposed to gases (such as oxygen and nitrogen) in the air or light. When the ink is used outdoors, it further has unexpectedly good weather-resistance.

In a specific example, the phthalocyanine copper dye is used to prepare a water-based inkjet ink composition according to the following recipe: comprising 1-20 weight percent of the phthalocyanine copper dye in the invention, 5-50 weight percent of organic solvent miscible with water and 30-90 weight percent of water, based on the total weight of the composition. Said organic solvent miscible with water is preferably selected from the following one or more: ethanol, propanol, isopropano, ethylene glycol, diethylene glycol, triethylene glycol, glycerol, diethylene glycol monobutyl ether, diethylene glycol monobutyl ether, triethylene glycol monobuthyl ether, propylene glycol, butanediol, pentanediol, hexanediol, diglycerol, 2-pyrrolidone and N-dimethyl-2-pyrrolidinone.

Optionally various other common auxiliaries can be added into the ink, such as surfactant (0-3%), ultraviolet absorber (0-3%), antioxidant (0-3%), preservative (0-3%), germicide (0-3%), ph regulator (0-3%), metal ion chelator (0-2%), humectant (0-15%), desiccant (0-5%), waterproofing agent (0-5%), and so on. The commonly used surfactants are such as non-ionic surface active agent, anionic surface active agent, polymeric surfactant, cationic surfactant, amphoteric surfactant.

The aforementioned various auxiliaries are described in many existing monographs and patents, such as described in U.S. Pat. No. 7,034,149, U.S. Pat. No. 6,086,955, U.S. Pat. No. 6,149,722, U.S. Pat. No. 6,235,097, U.S. Pat. No. 7,087, 107, U.S. Pat. No. 7,087,107, U.S. Pat. No. 7,211,134, US2007/0186810, various surfactants, ultraviolet absorber, antioxidant, preservative, germicide, ph regulator, metal ion chelator, humectant, desiccant, waterproofing agent.

The ink is prepared by the conventional method in the inkjet ink industry. The ink needs stir and may be subject to heating in preparation, then is filtered through porous filter film (aperture 0.02-0.8 μm) under atmospheric pressure of 0-30.

In the storage period before use, the ink has durable color stability so as not to be susceptible to fade, and can form images with same durable color stability after being spay-printed onto mediums.

Next, synthesis of the dye compound of the invention and weather-resistance thereof such as sun-resistance and anti-ozone performances will be described through the embodiment (but not limited to this embodiment). All the units in the embodiment are referred to weight unit.

Embodiment 1

Add copper phthalocyanine (58 units) in batch into 200 units of chlorosulfonate, and stir under 140-150° C. to react for 5 hours, followed by cooling down to 50° C., then add 20 units of thioyl chloride to continue the reflux reaction for 1 hour at 70-80, followed by cooling down to room temperature, pour it into 2000 units of ice water and filter, wash the filter cake for 3 times with 500 units of ice water, resulting in 505 units of dye wet filter cakes.

Add cyanuric tricholoride (38 units), 50% cyanamide water solution (19 units) into 500 units of water and stir to react at 0-5° C. for 5 hours, dropping $NaHCO_3$ water solution into it to control the reaction system pH at 7-8. Then allow the reaction to continue under room temperature for 1 hour. Add ethylenediamine (12 units) into the mixture and heat up to 40-45° C., dropping $NaHCO_3$ water solution into it to control the reaction system pH at 6-8, stir to react at this temperature for 5 hours. Then cool down to 10° C., add aforementioned chlorosulfurized filter cakes, add 1200 units of ice water, stir to react at 40-45° C., meanwhile, drop 10% NaOH water solution into it to control the reaction system pH at 8-9, and stir for 3 hours to react at 50-55° C. room temperature for 1 hour. Then add 50% cyanamide water solution (19 units), under the condition of dropping $NaHCO_3$ water solution into it to control the reaction system pH at 8-9, gradually heat up to 80-90° C., stir to react at this temperature for 3 hours. Then cool down to 50° C. and adjust the pH at 9-10 by adding 10% NaOH water solution, filter to exclude any possible insoluble impurity. Cool down the filtered solution to room temperature.

In the reverse-osmosis film, exclude sodium chloride in the system from the mixture resulted from the aforementioned reaction, resulting in 1139 units of mixed dye (Dye1) solution of solid content 9.2%. Through HPLC-ESI-MS analysis, the mixture mainly contains Dye1-1 and Dye1-2. Separation of HPLC preparation results in pure compounds of Dye1-1 and Dye1-2 respectively. The m/z peaks of Dye1-1 have (negative mode): 364.3 [(M-3Na)/3], 547.0 [(M-3Na+H)/2], 558.0 [(M-2Na)/2], M=1162. The m/z peaks of Dye1-1 have (negative mode): 507.0 [(M-2Na)/2, M=1060.

The HOMO of electron acceptor: −7.13 eV.

Dye 1-1

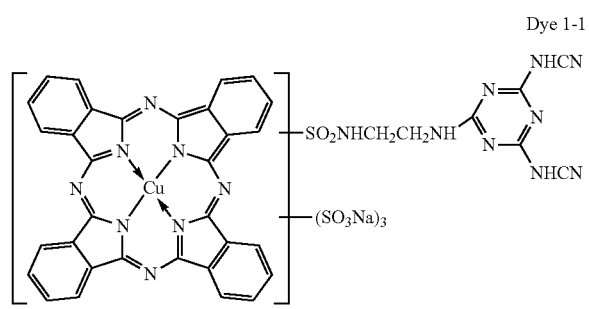

Dye 1-2

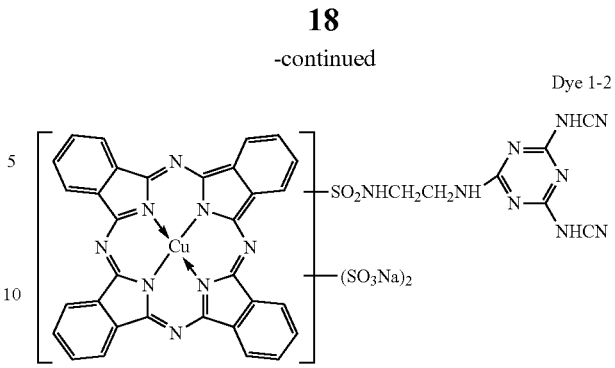

Embodiment 2

Add copper phthalocyanine (58 units) in batch into 200 units of chlorosulfonate, and stir under 140-150° C. to react for 4 hours, followed by cooling down to 50° C., then add 30 units of thioyl chloride to continue the reflux reaction for 1 hour at 70-80, followed by cooling down to room temperature, pour it into 2000 units of ice water and filter, wash the filter cake for 3 times with 500 units of ice water, resulting in 495 units of dye wet filter cakes.

Add cyanuric tricholoride (36 units), aniline-2,5-disulfate disodium (60 units) into 800 units of water and stir to react at 0-5° C. for 5 hours, dropping $NaHCO_3$ water solution into it to control the reaction system pH at 8-9. Then allow the reaction to continue under room temperature for 1 hour. Add ethylenediamine (12 units) into the mixture and heat up to 40-45° C., dropping $NaHCO_3$ water solution into it to control the reaction system pH at 8-9, stir to react at this temperature for 5 hours. Then cool down to 30° C., add aforementioned chlorosulfurized filter cakes, add 1000 units of ice water, stir to react at 40-45° C., meanwhile, drop 10% NaOH water solution into it to control the reaction system pH at 8-9, and stir for 3 hours, gradually heat up to 50-55° C. to react for 1 hour. Finally cool down to 40° C. and adjust the pH at 9-10 by adding 10% NaOH water solution, filter to exclude any possible insoluble impurity.

In the reverse-osmosis film, exclude sodium chloride in the system from the mixture resulted from the aforementioned reaction, resulting in 921 units of mixed Dye2 solution of solid content 15.8%, which mainly contains Dye2-1, Dye2-2, Dye2-3. Separation of HPLC preparation results in pure compounds of Dye2-1, Dye2-2, Dye2-3 respectively. The m/z peaks of Dye2-1 have (negative mode): 324.2 [(M-5Na+H)/4], 329.7 [(M-4Na)/4], 432.6 [(M-5Na+2H)/3], 440.0 [(M-4Na+H)/3], 649.4 [(M-5Na+3H)/2], 660.4 [(M-4Na+2H)/2], 671.4 [(M-3Na+H)/2], M=1410.8. The m/z peaks of Dye2-2 have (negative mode): 425.7, 426.2, 426.7 [(M-6Na+2H)/4], 431.2, 431.7, 432.2 [(M-5Na+H)/4], 436.7, 437.2, 437.7 [(M-4Na)/4], 568.0, 568.7, 569.3 [(M-6Na+3H)/3], 575.3, 576.0, 576.6 [(M-5Na+2H)/3], 582.6, 583.3, 583.9 [(M-4Na+H)/3], M=1838.8, 1840.8, 1842.8 (isotope). The m/z peaks of Dye2-3 have (negative mode): 304.2 [(M-4Na)/4], 406.0 [(M-4Na+H)/3], 413.3 [(M-3Na)/3], 609.5 [(M-4Na+2H)/2], 620.5 [(M-3Na+H)/2], 631.5 [(M-2Na)/2], M=1308.9.

The HOMO of electron acceptor: −6.83 eV.

for 5 hours. Then cool down to 30° C., add aforementioned chlorosulfurized filter cakes, add 1000 units of ice water, stir to react at 40-45° C., meanwhile, drop in 10% NaOH water solution to control the reaction system pH at 8-9, and stir for

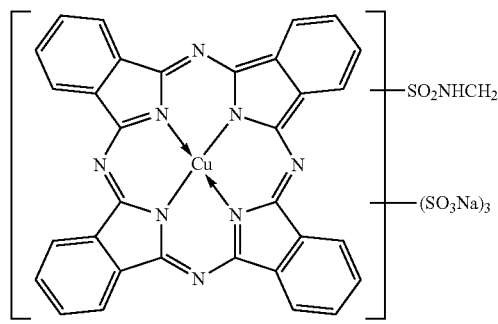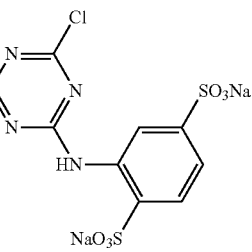

Dye 2-1

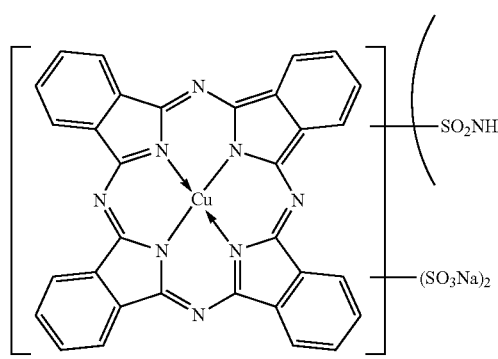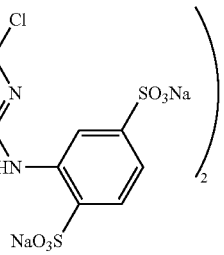

Dye 2-2

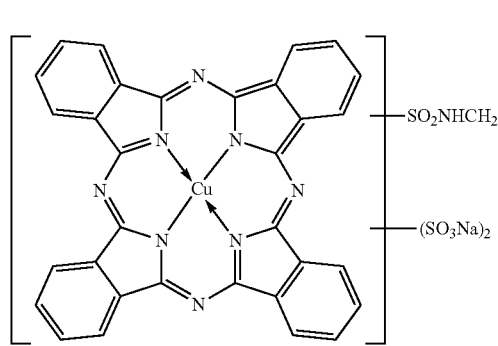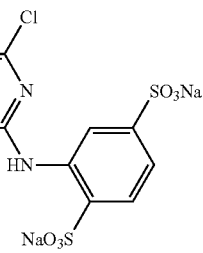

Dye 2-3

Embodiment 3

Add copper phthalocyanine (58 units) in batch into 200 units of chlorosulfonate, and stir under 140-150° C. to react for 4 hours, followed by cooling down to 50° C., then add 30 units of thioyl chloride to continue the reflux reaction for 1 hour at 70-80, followed by cooling down to room temperature, pour it into 2000 units of ice water and filter, wash the filter cake for 3 times with 500 units of ice water, resulting in 495 units of dye wet filter cakes.

Add cyanuric tricholoride (36 units), aniline-2,5-disulfate disodium (60 units) into 800 units of water and stir to react at 0-5° C. for 5 hours, dropping NaHCO$_3$ water solution into it to control the reaction system pH at 8-9. Then allow the reaction to continue under room temperature for 1 hour. Add ethylenediamine (12 units) into the mixture and heat up to 40-45° C., dropping NaHCO$_3$ water solution into it to control the reaction system pH at 8-9, stir to react at this temperature 3 hours, gradually heat up to react at 50-55° C. for 1 hour. Then add 50% cyanamide water solution (19 units), under the condition of dropping in 10% NaHCO$_3$ water solution to control the reaction system pH at 8-9, gradually heat up to 80-90° C., stir to react at this temperature for 3 hours. Finally cool down to 40° C. and adjust the pH at 9-10 by adding 10% NaOH water solution, filter to exclude any possible insoluble impurity.

In the reverse-osmosis film, exclude sodium chloride in the system from the mixture resulted from the aforementioned reaction, resulting in 959 units of mixed dye (Dye3) solution of solid content 15.1%. Through HPLC-ESI-MS analysis, the mixture mainly contains Dye3-1, Dye3-2 and Dye3-3. Separation of HPLC preparation results in pure compounds of Dye3-1, Dye3-2, Dye3-3 respectively. The m/z peaks of Dye3-1 have (negative mode): 325.7 [(M-5Na+H)/4], 331.2 [(M-4Na)/4], 434.6 [(M-5Na+2H)/3], 441.9 [(M-4Na+H)/3], 652.4 [(M-5Na+3H)/2], 663.4 [(M-4Na+2H)/2], 664.4 [(M-

3Na+H)/2], M=1416.9. The m/z peaks of Dye3-2 have (negative mode): 428.7 [(M-6Na+2H)/4], 434.2 [(M-5Na+H)/4], 439.7 [(M-4Na)/4], 572.0 [(M-6Na+3H)/3], 579.3 [(M-5Na+2H)/3], 586.6 [(M-4Na+H)/3], M=1850.9. The m/z peaks of D3-3 have (negative mode): 305.7 [(M-4Na)/4], 408.0 [(M-4Na+H)/3], 415.3 [(M-3Na)/3], 612.5 [(M-4Na+2H)/2], 623.5 [(M-3Na+H)/2], 6364.5 [(M-2Na)/2], M=1314.9.

The HOMO of electron acceptor: −6.83 eV.

0-5° C. for 5 hours, dropping NaHCO$_3$ water solution into it to control the reaction system pH at 8-9. Then allow the reaction to continue under room temperature for 1 hour. Add ethylenediamine (6 units) into the mixture and heat up to 40-45° C., dropping NaHCO$_3$ water solution into it to control the reaction system pH at 8-9, stir to react at this temperature for 5 hours. Then cool down to 30° C., add aforementioned chlorosulfurized filter cakes, add 800 units of ice water, stir to

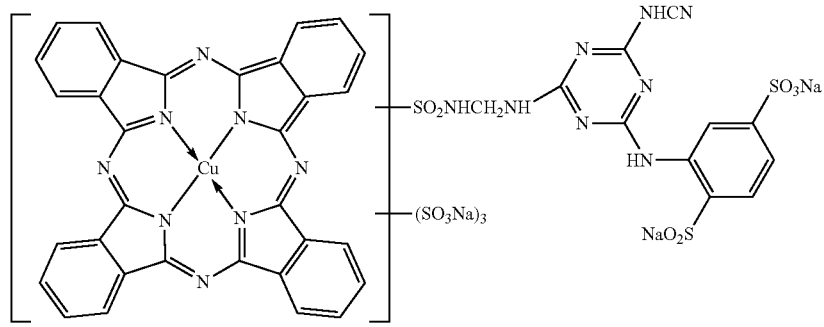

Dye 3-1

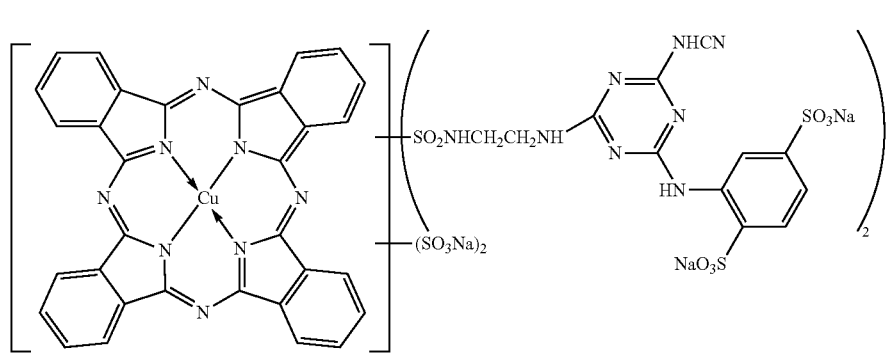

Dye3-2

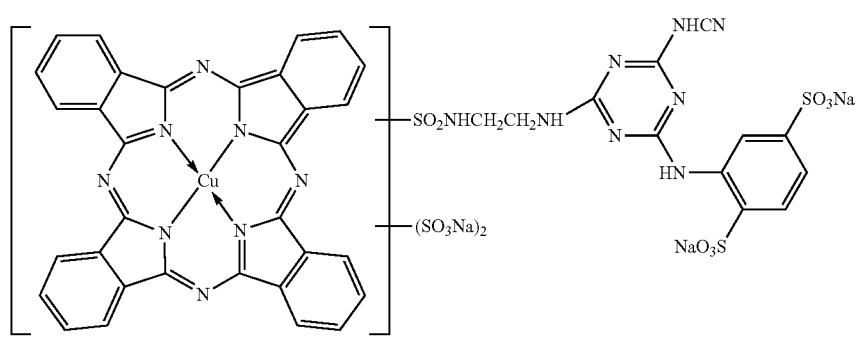

Dye 3-3

Embodiment 4

Add copper phthalocyanine (58 units) in batch into 200 units of chlorosulfonate, and stir under 135-140° C. to react for 4 hours, followed by cooling down to 50° C., then add 15 units of thioyl chloride to continue the reflux reaction for 1 hour at 70-80, followed by cooling down to room temperature, pour it into 2000 units of ice water and filter, wash the filter cake for 3 times with 500 units of ice water, resulting in 460 units of dye wet filter cakes.

Add cyanuric tricholoride (18 units), aniline-2,5-disulfate disodium (30 units) into 500 units of water and stir to react at react at 40-45° C., meanwhile, drop in 10% NaOH water solution to control the reaction system pH at 8-9, and stir for 3 hours. Then add 26 units of diethanolamine, then react under aforementioned conditions for 2 hours, gradually heat up to 90-95° C. to react for 2 hours, keep pH at 8-9. Then cool down to 40° C. and adjust the pH at 9-10 by adding 10% NaOH water solution, filter to exclude any possible insoluble impurity.

In the reverse-osmosis film, exclude sodium chloride in the system from the mixture resulted from the aforementioned reaction, resulting in 119 units of mixed dye (Dye4) solution of solid content 14.5%. Through HPLC-ESI-MS analysis, the mixture mainly contains Dye4-1 and Dye4-2. Separation of HPLC preparation results in pure compounds of Dye4-1 and Dye4-2 respectively. The m/z peaks of Dye4-1 have (negative mode): 363.2 [(M-4Na)/4], 484.7 [(M-4Na+H)/3], 492.0 [(M-3Na)/3], 727.5 [(M-4Na+2H)/2], 738.5 [(M-3Na+H)/2], M=1545.0. The m/z peaks of Dye4-2 have (negative mode): 464.3 [(M-6Na+2H)/4], 469.8 [(M-5Na+H)/4], 475.3 [(M-4Na)/4], 619.3 [(M-6Na+3H)/3], 626.6 [(M-5Na+2H)/3], M=1993.0.

The HOMO of electron acceptor: −6.40 eV.

Add cyanuric tricholoride (18 units), diethanolamine (11 units) into 500 units of water and stir to react at 0-5° C. for 5 hours, dropping NaHCO$_3$ water solution into it to control the reaction system pH at 8-9. Then allow the reaction to continue under room temperature for 1 hour. Add ethylenediamine (6 units) into the mixture and heat up to 40-45° C., dropping NaHCO$_3$ water solution into it to control the reaction system pH at 8-9, stir to react at this temperature for 5 hours. Then cool down to 30° C., add aforementioned chlorosulfurized filter cakes, add 800 units of ice water, stir to react at 40-45° C., meanwhile, drop in 10% NaOH water solution to control

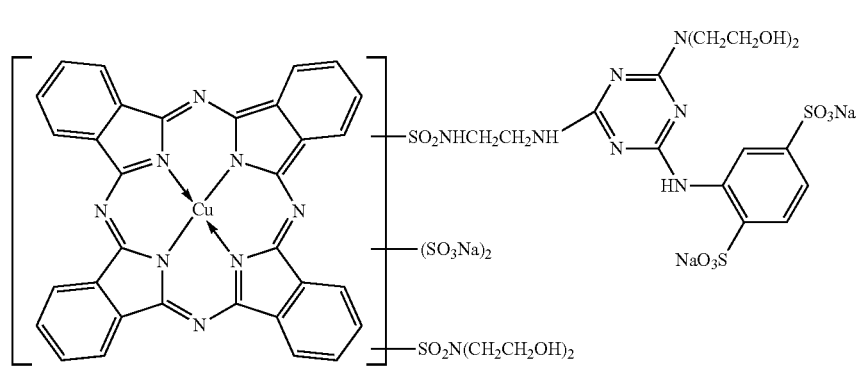

Dye 4-1

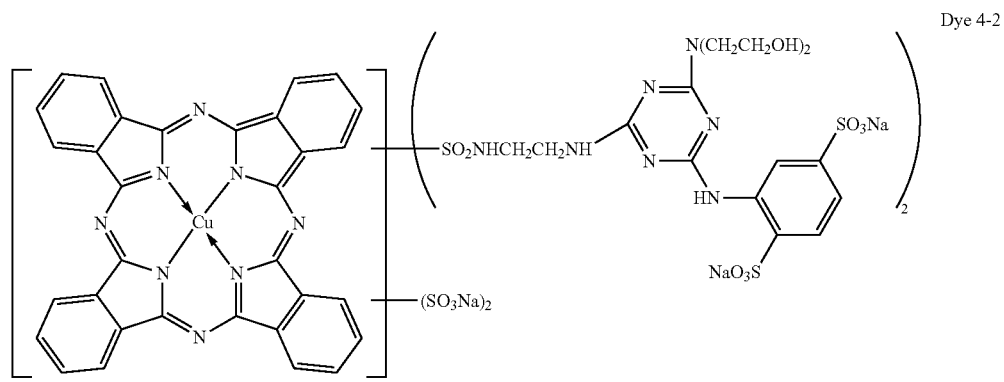

Dye 4-2

Embodiment 5

Add copper phthalocyanine (58 units) in batch into 200 units of chlorosulfonate, and stir under 135-140° C. to react for 4 hours, followed by cooling down to 50° C., then add 15 units of thioyl chloride to continue the reflux reaction for 1 hour at 70-80, followed by cooling down to room temperature, pour it into 2000 units of ice water and filter, wash the filter cake for 3 times with 500 units of ice water, resulting in 460 units of dye wet filter cakes.

the reaction system pH at 8-9, and stir for 3 hours. Then add 26 units of diethanolamine, then react under aforementioned conditions for 2 hours, gradually heat up to 90-95° C. to react for 2 hours, keep pH at 8-9. Then cool down to 40° C. and adjust the pH at 9-10 by adding 10% NaOH water solution, filter to exclude any possible insoluble impurity.

In the reverse-osmosis film, exclude sodium chloride in the system from the mixture resulted from the aforementioned reaction, resulting in 1130 units of mixed dye (Dye5) solution of solid content 11.2%. Through HPLC-ESI-MS analysis, the mixture mainly contains Dye5-1, Dye5-2 and Dye5-3. Separation of HPLC preparation results in pure compounds of Dye5-1, Dye5-2 and Dye5-3 respectively. The m/z peaks of Dye5-1 have (negative mode): 406.3 [(M-3Na)/3], 610.0 [(M-3Na+H)/2], 621.0 [(M-2Na)/2], M=1288.1. The m/z peaks of Dye4-2 have (negative mode): 653.5 [(M-2Na)/2], M=1353.1. The m/z peaks of Dye5-3 have (negative mode): 781.6 [(M-2Na)/2], M=1609.3.

The HOMO of electron acceptor: −5.82 eV.

In the reverse-osmosis film, exclude sodium chloride in the system from the mixture resulted from the aforementioned reaction, resulting in 760 units of mixed dye (Dye6) solution of solid content 10.2%. Through HPLC-ESI-MS analysis, the m/z peaks of Dye6-1 contained in the mixture have (negative mode): 341.6 [(M-3Na)/3], 513.0 [(M-3Na+H)/2], 524.0 [(M-2Na)/2], M=1093.9.

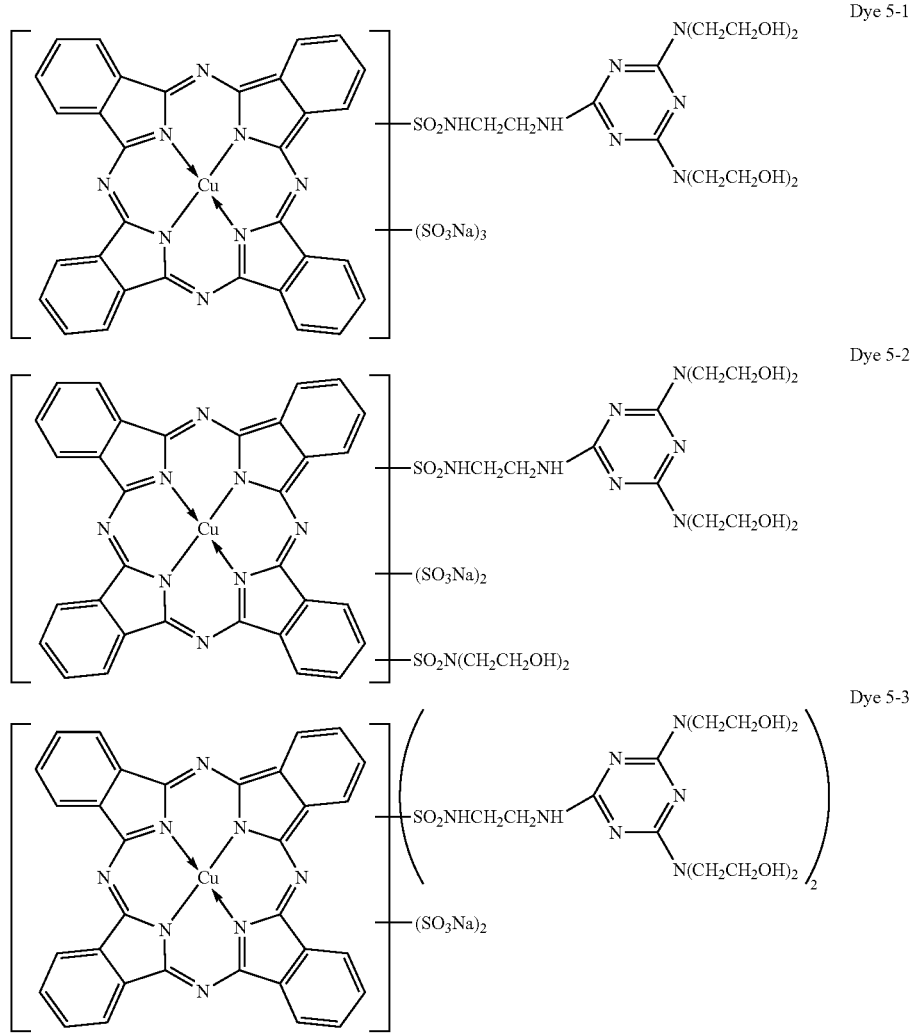

Embodiment 6

Add copper phthalocyanine (58 units) in batch into 200 units of chlorosulfonate, and stir under 135-140° C. to react for 4 hours, followed by cooling down to 50° C., then add 15 units of thioyl chloride to continue the reflux reaction for 1 hour at 70-80, followed by cooling down to room temperature, pour it into 2000 units of ice water and filter, wash the filter cake for 3 times with 500 units of ice water, resulting in 460 units of dye wet filter cakes.

In the condition of 30° C., add aforementioned chlorosulfonated filter cakes, add 800 units of ice water, 16 units of 2-(2-aminoethyl)-p-benzoquinone and stir to react at 30-40° C., meanwhile, dropping 10% $NaHCO_3$ water solution into it to control the reaction system pH at 8-9, stir for 5 hours. Then adjust the pH at 9-10 by adding 10% NaOH water solution, filter to exclude any possible insoluble impurity.

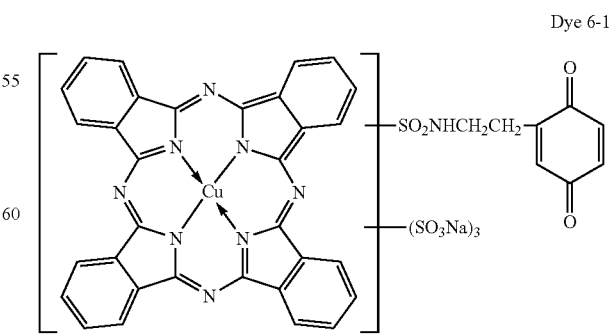

The HOMO of electron acceptor: −7.35 eV.

Embodiment 7

Add copper phthalocyanine (58 units) in batch into 200 units of chlorosulfonate, and stir under 140-150° C. to react for 4 hours, followed by cooling down to 50° C., then add 30 units of thioyl chloride to continue the reflux reaction for 1 hour at 70-80, followed by cooling down to room temperature, pour it into 2000 units of ice water and filter, wash the filter cake for 3 times with 500 units of ice water, resulting in 495 units of chlorosulfonated dye wet filter cakes.

Add cyanuric tricholoride (36 units), aniline-2,5-disulfate disodium (60 units) into 800 units of water and stir to react at 0-5° C. for 5 hours, dropping $NaHCO_3$ water solution into it to control the reaction system pH at 8-9. Then allow the reaction to continue under room temperature for 1 hour. Add ethylenediamine (12 units) into the mixture and heat up to 40-45° C., dropping $NaHCO_3$ water solution into it to control the reaction system pH at 8-9, stir to react at this temperature for 5 hours. Then cool down to 30° C., add aforementioned chlorosulfurized filter cakes, add 1000 units of ice water, stir to react at 40-45° C., meanwhile, drop 10% NaOH water solution and 20% $N(CH_2CH_2OH)_2$ water solution into it to control the reaction system pH at 8-9, and stir for 3 hours, gradually heat up to 50-55° C. to react for 1 hour. Finally cool down to 40° C. and adjust the pH at 9-10 by adding 10% NaOH water solution, filter to exclude any possible insoluble impurity.

In the reverse-osmosis film, exclude sodium chloride in the system from the mixture resulted from the aforementioned reaction, resulting in 921 units of mixed dye (Dye7) solution of solid content 15.8%. As HPLC-ESI-MS analyzed, the mixed dye mainly contains Dye7-1, Dye7-2 and Dye7-3, Dye7-4. Separation of HPLC preparation results in pure compounds of Dye7-1, Dye7-2, Dye7-3 and Dye7-4 respectively. The m/z peaks of Dye7-1 have (negative mode): 346.0 [(M-4Na)/4], 461.6 [(M-4Na+H)/3], 469.0 [(M-3Na)/3], 693.0 [(M-4Na+2H)/2], 704.0 [(M-3Na+H)/2], 716.0 [(M-2Na)/2], M=1475.9. The m/z peaks of Dye7-2 have (negative mode): 435.0 [(M-3Na)/3], 653.0 [(M-3Na+H)/2], 664.0 [(M-2Na)/2], M=1374.0. The m/z peaks of Dye7-3 have (negative mode): 447.5, 447.7, 448.0 [(M-5Na+H)/4], 453.0, 453.2, 453.6 [(M-4Na)/4], 597.0, 597.2, 597.5 [(M-5Na+2H)/3], 604.3, 604.5, 604.7 [(M-4Na+H)/3], 896.0, 896.2, 896.5 [(M-5Na+3H)/2]. M=1903.9, 1904.9, 1905.9 (isotope). The m/z peaks of Dye7-4 have (negative mode): 427.5, 428.0 [(M-4Na)/4]; 570.3, 570.9 [(M-4Na+H)/3], 577.6, 578.3 [(M-3Na)/3], M=1801.9, 1803.9.

The HOMO of electron acceptor: −7.13 eV.

Dye 7-1

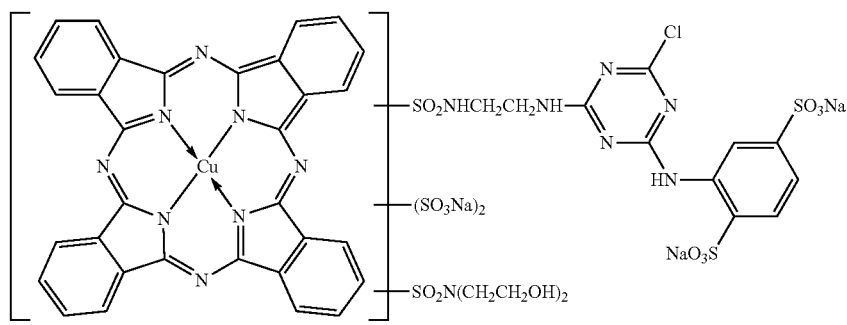

Dye 7-1

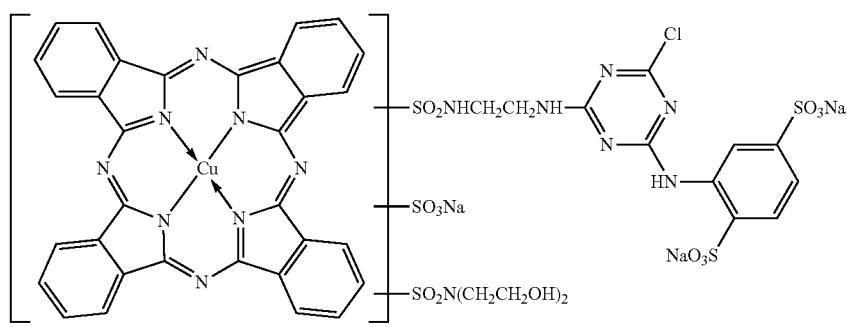

Dye 7-2

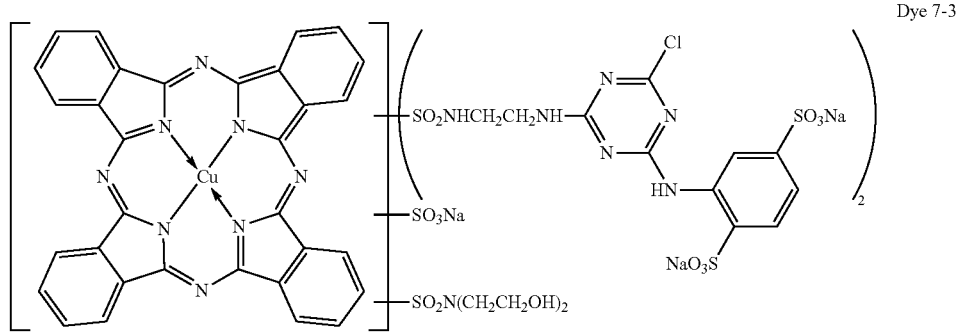

Dye 7-3

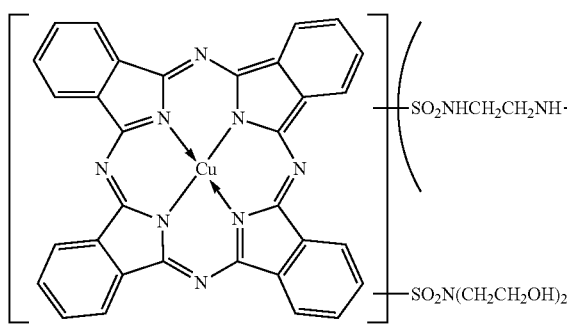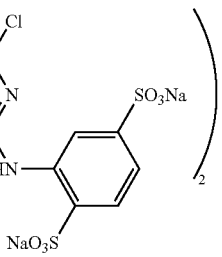

Dye 7-4

Embodiment 8

Add copper phthalocyanine (58 units) in batch into 200 units of chlorosulfonate, and stir under 140-150° C. to react for 4 hours, followed by cooling down to 50° C., then add 30 units of thioyl chloride to continue the reflux reaction for 1 hour at 70-80, followed by cooling down to room temperature, pour it into 2000 units of ice water and filter, wash the filter cake for 3 times with 500 units of ice water, resulting in 495 units of chlorosulfonated dye wet filter cakes.

Add cyanuric tricholoride (36 units), aniline-2,5-disulfate disodium (60 units) into 800 units of water and stir to react at 0-5° C. for 5 hours, dropping $NaHCO_3$ water solution into it to control the reaction system pH at 8-9. Then allow the reaction to continue under room temperature for 1 hour. Add ethylenediamine (12 units) into the mixture and heat up to 40-45° C., dropping $NaHCO_3$ water solution into it to control the reaction system pH at 8-9, stir to react at this temperature for 5 hours. Then cool down to 30° C., add aforementioned chlorosulfurized filter cakes, add 1000 units of ice water, stir to react at 40-45° C., meanwhile, drop in 10% NaOH water solution and 20% $NH_2CH_2CH_2SO_3Na$(sodium taurate) water solution to control the reaction system pH at 8-9, and stir for 3 hours, gradually heat up to 50-55° C. to react for 1 hour.

Finally cool down to 40° C. and adjust the pH at 9-10 by adding 10% NaOH water solution, filter to exclude any possible insoluble impurity.

In the reverse-osmosis film, exclude salt such as sodium chloride in the system from the mixture resulted from the aforementioned reaction, resulting in 921 units of mixed dye (Dye8) solution of solid content 15.8%. As HPLC-ESI-MS analyzed, the mixed dye mainly contains Dye8-1, Dye8-2 and Dye8-3. Separation of HPLC preparation results in pure compounds of Dye8-1, Dye8-2 and Dye8-3 respectively. The m/z peaks of Dye8-1 have (negative mode): 351.0 [(M-5Na+H)/4], 356.4 [(M-4Na)/4], 468.3 [(M-5Na+2H)/3], 475.6 [(M-4Na+H)/3], 702.9 [(M-5Na+3H)/2], 713.9 [(M-4Na+2H)/2], 724.9 [(M-3Na+H)/2], M=1517.8. The m/z peaks of Dye8-2 have (negative mode): 331.0 [(M-4Na)/4], 441.6 [(M-4Na+H)/3], 449.0 [(M-3Na)/3], 663.0 [(M-4Na+2H)/2], 674.0 [(M-3Na+H)/2], 685.0 [(M-2Na)/2], M=1415.9. The m/z peaks of Dye8-3 have (negative mode): 452.4, 452.9 [(M-6Na+2H)/4], 458.0, 458.5 [(M-5Na+H)/4], 463.4, 463.5 [(M-4Na)/4], 603.6, 604.2 [(M-6Na+3H)/3], 610.9, 611.6 [(M-5Na+2H)/3], 618.3, 618.9 [(M-4Na+H)/3], M=1945.8, 1947.8 (isotope).

The HOMO of electron acceptor: −7.13 eV.

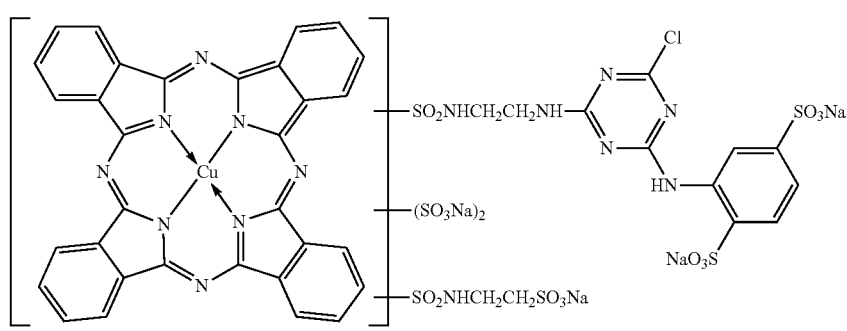

Dye 8-1

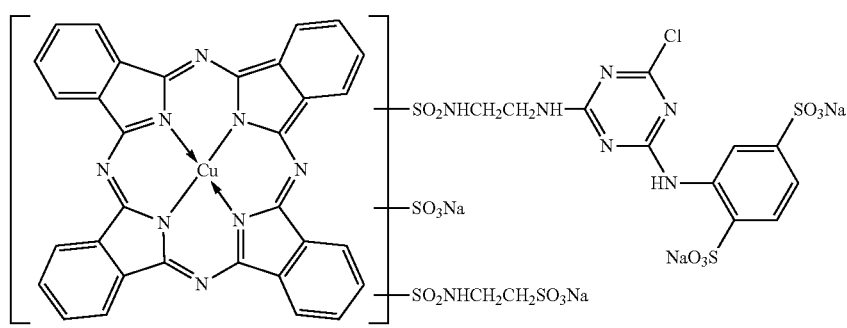

Dye 8-2

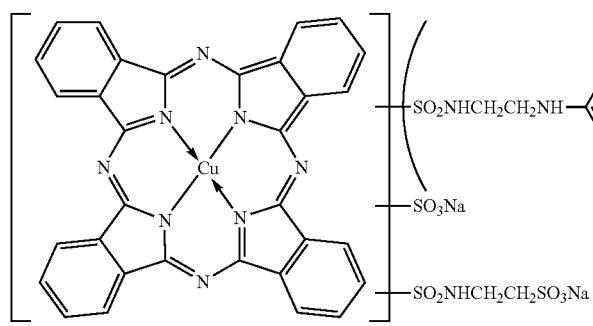
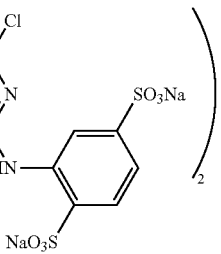

Dye 8-3

Embodiment 9

Add copper phthalocyanine (58 units) in batch into 200 units of chlorosulfonate, and stir under 140-150° C. to react for 4 hours, followed by cooling down to 50° C., then add 30 units of thioyl chloride to continue the reflux reaction for 1 hour at 70-80, followed by cooling down to room temperature, pour it into 2000 units of ice water and filter, wash the filter cake for 3 times with 500 units of ice water, resulting in 495 units of chlorosulfonated dye wet filter cakes.

Add cyanuric tricholoride (36 units), aniline-2,5-disulfate disodium (60 units) into 800 units of water and stir to react at 0-5° C. for 5 hours, dropping NaHCO₃ water solution into it to control the reaction system pH at 8-9. Then allow the reaction to continue under room temperature for 1 hour. Add ethylenediamine (12 units) into the mixture and heat up to 40-45° C., dropping NaHCO₃ water solution into it to control the reaction system pH at 8-9, stir to react at this temperature for 5 hours. Then cool down to 30° C., add aforementioned chlorosulfurized filter cakes, add 1000 units of ice water, add 18 units of sodium p-aminobenzene sulfonate, stir to react at 40-45° C., meanwhile, drop 10% NaOH water solution into it to control the reaction system pH at 8-9, and stir for 3 hours, gradually heat up to 50-55° C. to react for 1 hour. Finally cool down to 40° C. and adjust the pH at 9-10 by adding 10% NaOH water solution, filter to exclude any possible insoluble impurity.

In the reverse-osmosis film, exclude salt such as sodium chloride in the system from the mixture resulted from the aforementioned reaction, resulting in 921 units of mixed dye (Dye2) solution of solid content 15.8%. As HPLC-ESI-MS analyzed, the mixed dye mainly contains Dye9-1, Dye9-2 and Dye9-3. Separation of HPLC preparation results in pure compounds of Dye9-1, Dye9-2 and Dye9-3 respectively. The m/z peaks of Dye9-1 have (negative mode): 363.0 [(M-5Na+H)/4], 368.4 [(M-4Na)/4], 484.3 [(M-5Na+2H)/3], 491.5 [(M-4Na+H)/3], 726.9 [(M-5Na+3H)/2], 737.9 [(M-4Na+2H)/2], 748.9 [(M-3Na+H)/2], M=1565.8. The m/z peaks of Dye9-2 have (negative mode): 343.0 [(M-4Na)/4], 457.6 [(M-4Na+H)/3], 464.9 [(M-3Na)/3], 687.0 [(M-4Na+2H)/2], 698.0 [(M-3Na+H)/2], 709.0 [(M-2Na)/2], M=1463.9. The m/z peaks of Dye9-3 have (negative mode): 464.4, 464.5 [(M-6Na+2H)/4], 470.0, 470.5 [(M-5Na+H)/4], 475.4, 475.9 [(M-4Na)/4], 619.6, 621.3 [(M-6Na+3H)/3], 626.9, 627.6 [(M-5Na+2H)/3], 634.2, 634.9 [(M-4Na+H)/3], M=1993.8, 1995.8 (isotope).

The HOMO of electron acceptor: −7.13 eV.

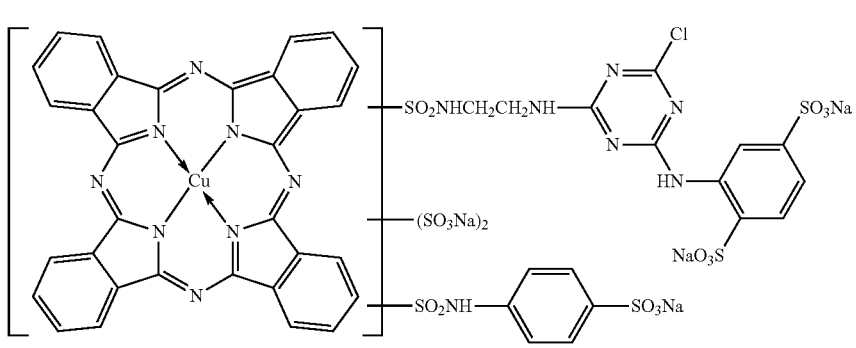

Dye 9-1

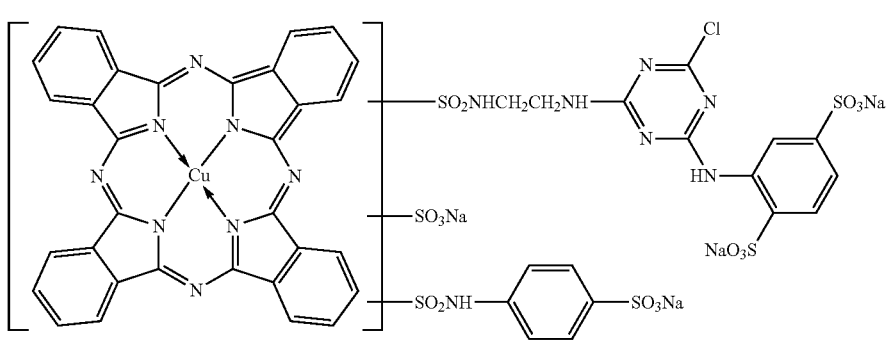

Dye 9-2

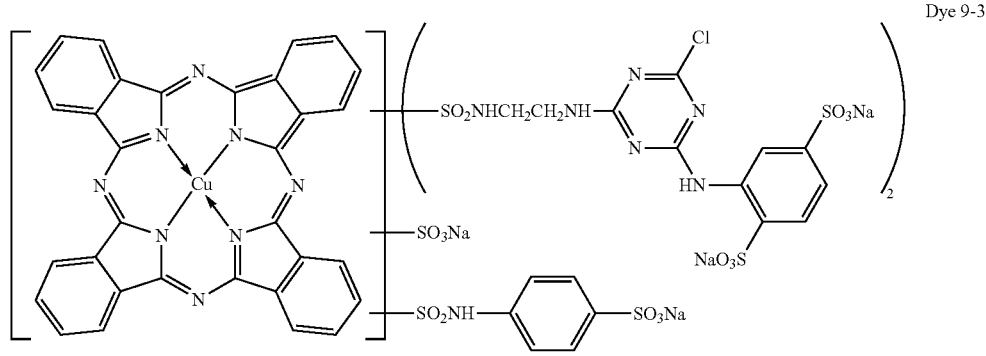
Dye 9-3

In the same way, during the aforementioned preparation process, substitute the added 18 units of sodium p-aminobenzene sulfonate with 11 units of 3-alanine, resulting in 901 units of mixed dye (Dye9') solution of solid content 14.2%. As HPLC-ESI-MS analyzed, the mixed dye mainly contains Dye9'-1, Dye9'-2 and Dye9'-3. Separation of HPLC preparation obtain pure compounds of Dye9'-1, Dye9'-2 and Dye9'-3 respectively. The m/z peaks of Dye9'-1 have (negative mode): 342.0 [(M-5Na+H)/4], 347.5 [(M-4Na)/4], 456.3 [(M-5Na+2H)/3], 465.5 [(M-4Na+H)/3], 685.4 [(M-5Na+3H)/2], 696.4 [(M-4Na+2H)/2], 707.4 [(M-3Na+H)/2], M=1481.9. The m/z peaks of Dye9'-2 have (negative mode): 322.0 [(M-4Na)/4], 430.0 [(M-4Na+H)/3], 437.3 [(M-3Na)/3], 645.0 [(M-4Na+2H)/2], 656.0 [(M-3Na+H)/2], 667.0 [(M-2Na)/2], M=1379.9. The m/z peaks of Dye9'-3 have (negative mode): 443.4, 443.9 [(M-6Na+2H)/4], 449.0, 449.5 [(M-5Na+H)/4], 454.4, 454.9 [(M-4Na)/4], 591.6, 592.3 [(M-6Na+3H)/3], 598.9, 599.6 [(M-5Na+2H)/3], 606.2, 606.9 [(M-4Na+H)/3], M=1909.8, 1911.8 (isotope).

The HOMO of electron acceptor: −7.13 eV.

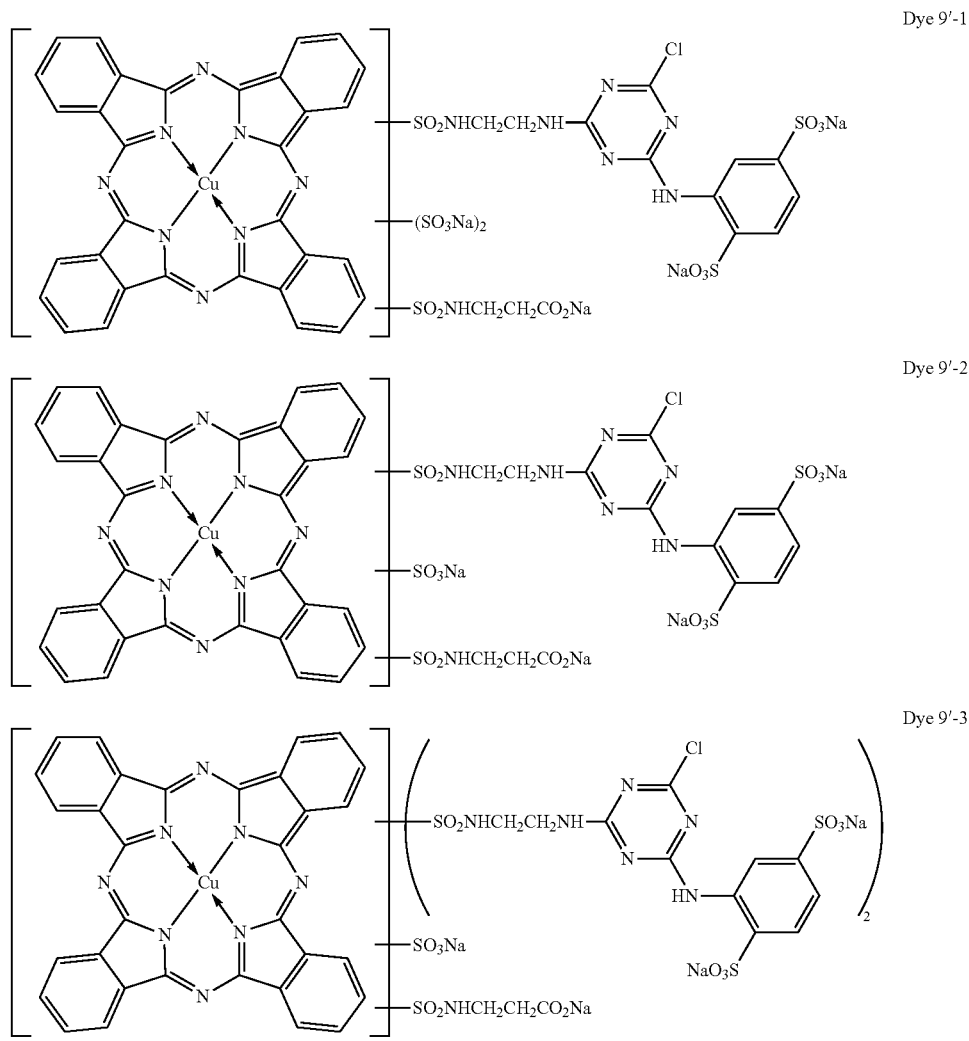

Dye 9'-1

Dye 9'-2

Dye 9'-3

In the same way, during the aforementioned preparation process, substitute the added 18 units of sodium p-aminobenzene sulfonate or added 11 units of 3-alanine with 22 units of disodium p-aminobenzene phosphate, resulting in 935 units of mixed dye (Dye 9″) solution of solid content 15.1%. As HPLC-ESI-MS analyzed, the mixed dye mainly contains Dye9″-1, Dye9″-2 and Dye9″-3. Separation of HPLC preparation obtain pure compounds of Dye9″-1, Dye9″-2 and Dye9″-3 respectively. The m/z peaks of Dye9″-1 have (negative mode): 368.4 [(M-5Na+H)/4], 373.9 [(M-4Na)/4], 491.6 [(M-5Na+2H)/3], 498.9 [(M-4Na+H)/3], 737.9 [(M-5Na+3H)/2], 748.9 [(M-4Na+2H)/2], 759.9 [(M-3Na+H)/2], M=1587.8. The m/z peaks of Dye9″-2 have (negative mode): 348.5 [(M-4Na)/4], 464.9 [(M-4Na+H)/3], 472.2 [(M-3Na)/3], 698.0 [(M-4Na+2H)/2], 709.0 [(M-3Na+H)/2], 720.0 [(M-2Na)/2], M=1485.9. The m/z peaks of Dye9″-3 have (negative mode): 469.9, 470.4 [(M-6Na+2H)/4], 475.5, 476.0 [(M-5Na+H)/4], 480.9, 481.4 [(M-4Na)/4], 626.9, 627.6 [(M-6Na+3H)/3], 634.2, 634.9 [(M-5Na+2H)/3], 641.5, 642.2 [(M-4Na+H)/3], M=2015.8, 2017.8 (isotope).

The HOMO of electron acceptor: −7.13 eV.

Embodiment 10

In embodiment 2, substitute all the pH-adjusting alkaline agents $NaHCO_3$ water solution or NAOH water solution with 10% $N^+(CH_3)_4OH^-$ water solution, resulting in 952 units of mixed dye (Dye2′) solution of solid content 16.2%. As HPLC-ESI-MS analyzed, the mixed dye mainly contains Dye2′-1, Dye2′-2 and Dye2′-3. Separation of HPLC preparation-obtain pure compounds of Dye2′-1, Dye2′-2 and Dye2′-3 respectively. The m/z peaks of Dye2-1 have (negative mode): 324.2, 324.4, 324.5 [(M-5(NMe₄)+H)/4], 342.5, 342.8, 343.1 [(M-4(NMe₄))/4], 432.6, 432.9, 433.6 [(M-5(NMe₄)+2H)/3], 457.0, 457.3, 458.0 [(M-4(NMe₄)+H)/3], M=1666.4, 1667.4, 1669.4 (isotope). The m/z peaks of Dye2-2 have (negative mode): 425.7, 425.9, 425.3, 425.5 [(M-6(NMe₄)+2H)/4], 444.0, 444.2, 444.5, 444.8 [(M-5(NMe₄)+H)/4], 568.0, 568.3, 568.7, 569.0 [(M-6(NMe₄)+2H)/3], M=2145.4, 2146.4, 2147.4, 2148.4 (isotope). The m/z peaks of Dye2′-3 have (negative mode): 304.2, 304.5 [(M-4(NMe₄))/4], 406.0, Dye 9″-1
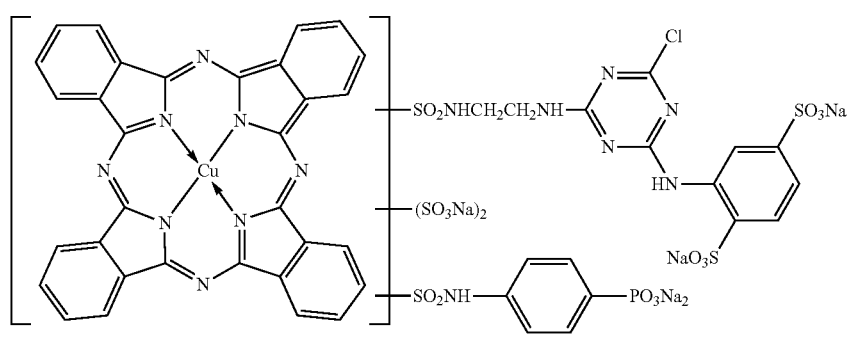

Dye 9″-2
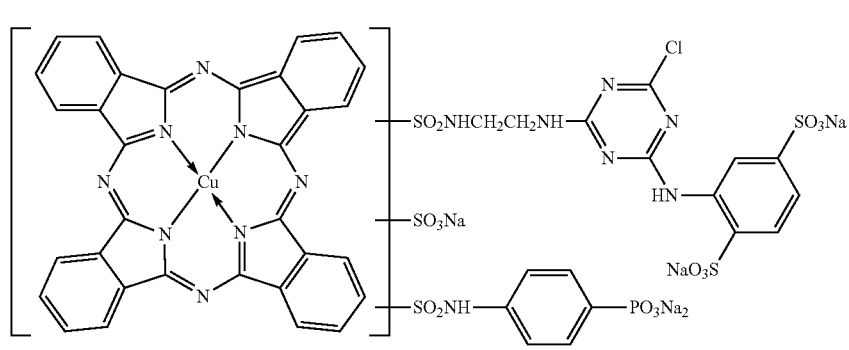

Dye 9″-3
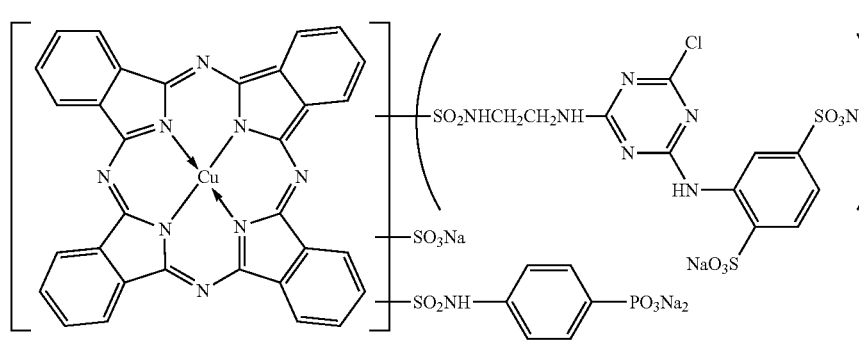

406.3 [(M-4(NMe$_4$)+H)/3], 430.3, 430.6 [(M-3(NMe$_4$))/3], 609.5, 610.0 [(M-4(NMe$_4$)+2H)/2], M=1513.3, 1514.3 (isotope).

The HOMO of electron acceptor: −7.13 eV.

tive mode): 324.2, 324.4 [(M-5(NH(CH$_2$CH$_2$OH)$_3$)+H)/4], 361.5, 361.7 [(M-4(NH(CH$_2$CH$_2$OH)$_3$))/4], 432.6, 432.9 [(M-5(NH(CH$_2$CH$_2$OH)$_3$)+2H)/3], 482.3, 482.6 [(M-4(NH(CH$_2$CH$_2$OH)$_3$)+H)/3], M=2046.4, 2047.4 (isotope). The

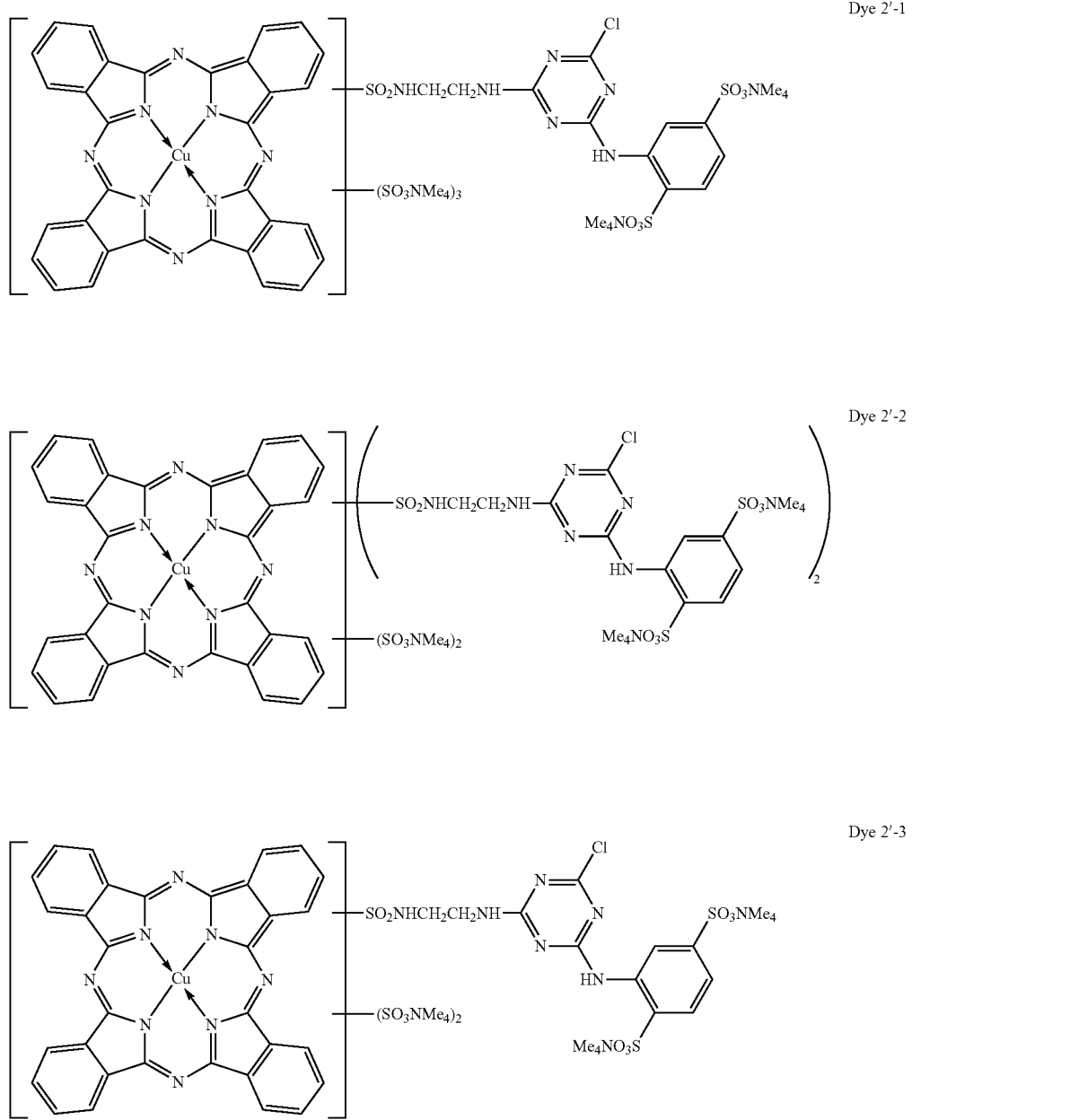

Dye 2'-1

Dye 2'-2

Dye 2'-3

In embodiment 2, substitute all the pH-adjusting alkaline agents NaHCO$_3$ water solution or NAOH water solution with 10% N(CH$_2$CH$_2$OH)$_3$ water solution, resulting in 952 units of mixed dye (Dye2") solution of solid content 16.2%. As HPLC-ESI-MS analyzed, the mixed dye mainly contains Dye2"-1, Dye2"-2 and Dye2"-3. Separation of HPLC preparation obtain pure compounds of Dye2"-1, Dye2"-2 and Dye2"-3 respectively. The m/z peaks of Dye2"-1 have (negam/z peaks of Dye2"-2 have (negative mode): 425.7, 425.9, 425.3, 425.5 [(M-6(NH(CH$_2$CH$_2$OH)$_3$)+2H)/4], 463.0, 463.3, 463.5, 463.7 [(M-5(NH(CH$_2$CH$_2$OH)$_3$)+H)/4], 568.0, 568.3, 568.7, 569.0 [(M-6(NH(CH$_2$CH$_2$OH)$_3$)+3H)/3], M=2601.5, 2602.5, 2603.5, 2604.5 (isotope). The m/z peaks of Dye2"-3 have (negative mode): 304.2, 304.5 [(M-4(NH(CH$_2$CH$_2$OH)$_3$))/4], 406.0, 406.3 [(M-4(NH(CH$_2$CH$_2$OH)

$_3$)+H)/3], 455.7, 456.0 [(M-3(NH(CH$_2$CH$_2$OH)$_3$))/3], 609.5, 610.0 [(M-4(NH(CH$_2$CH$_2$OH)$_3$)+2H)/2], M=1817.4, 1818.4 (isotope).

The HOMO of electron acceptor: −7.13 eV.

mainly contains Dye11-1, Dye11-2 and Dye11-3. Separation of HPLC preparation results in pure compounds of Dye11-1, Dye11-2 and Dye11-3 respectively. The m/z peaks of Dye11-1 have (negative mode): 304.2 [(M-5Na+H)/4], 309.7

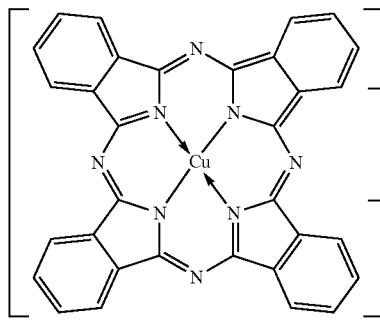
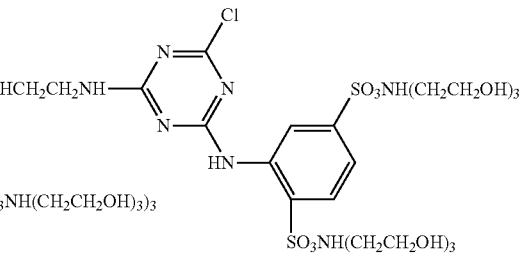

Dye 2″-1

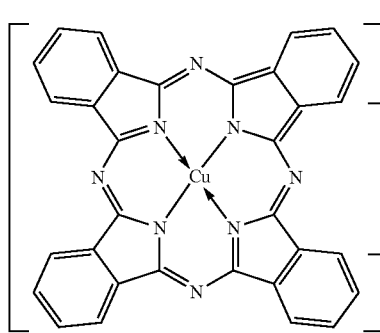
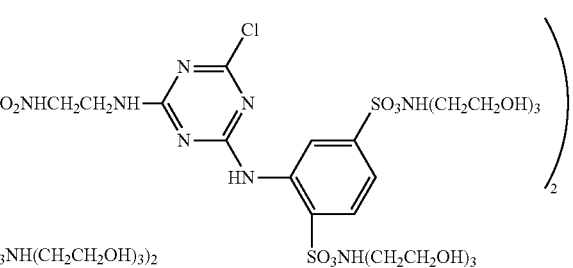

Dye 2″-2

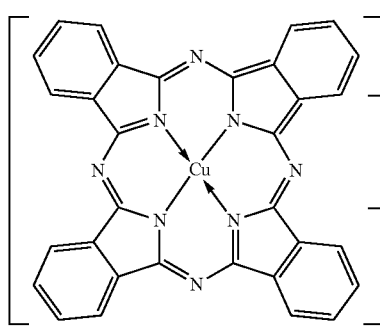
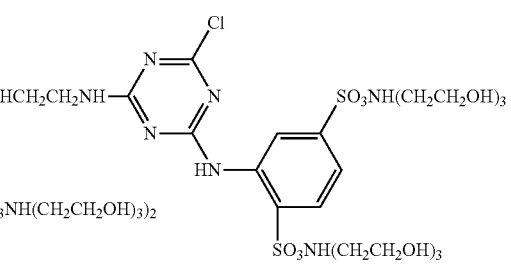

Dye 2″-3

Embodiment 11

In embodiment 2, substitute aniline-2,5-disulfate disodium (60 units) with disodium p-aminobenzene phosphate (22 units), with same substitution methods and process, it can results in 851 units of mixed dye (Dye11) solution of solid content 15.8%. As HPLC-ESI-MS analyzed, the mixed dye

[(M-4Na)/4], 406.0 [(M-5Na+2H)/3], 413.3 [(M-4Na+H)/3], 609.4 [(M-5Na+3H)/2], 620.4 [(M-4Na+2H)/2], 631.4 [(M-3Na+H)/2], M=1330.9. The m/z peaks of Dye11-2 have (negative mode): 385.7, 386.2 [(M-6Na+2H)/4], 319.2, 319.7 [(M-5Na+H)/4], 396.7, 397.2 [(M-4Na)/4], 514.6, 515.3 [(M-6Na+3H)/3], 521.9, 522.6 [(M-5Na+2H)/3], 529.2, 529.9 [(M-4Na+H)/3], M=1678.9, 1680.9 (isotope). The m/z peaks of Dye11-3 have (negative mode): 284.2 [(M-4Na)/4], 379.3 [(M-4Na+H)/3], 386.6 [(M-3Na)/3], 569.5 [(M-4Na+2H)/2], 580.5 [(M-3Na+H)/2], 591.5 [(M-2Na)/2], M=1228.9.

The HOMO of electron acceptor: −6.48 eV.

compounds of Dye12-1, Dye12-2 and Dye12-3 respectively. The m/z peaks of Dye12-1 have (negative mode): 356.7 [(M-6Na+2H)/4], 362.2 [(M-5Na+H)/4], 367.7 [(M-4Na)/4], 475.9 [M-6Na+3H)/3], +7.3 483.2 [(M-5Na+2H)/3], 490.5 [(M-4Na+H)/3], M=1562.8. The m/z peaks of Dye12-2 have

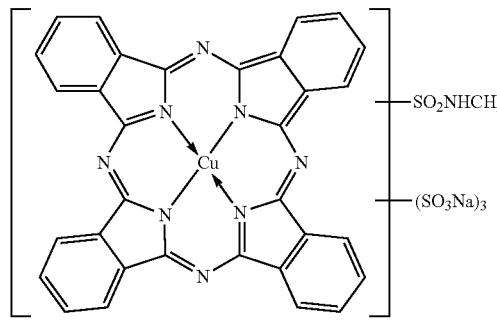

Dye 11-1

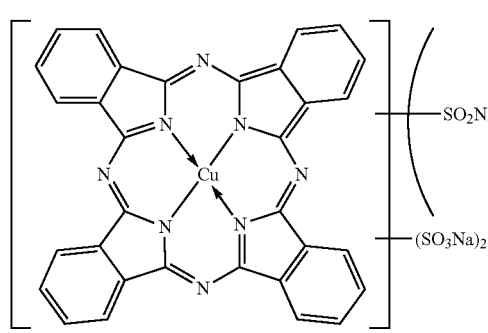

Dye 11-2

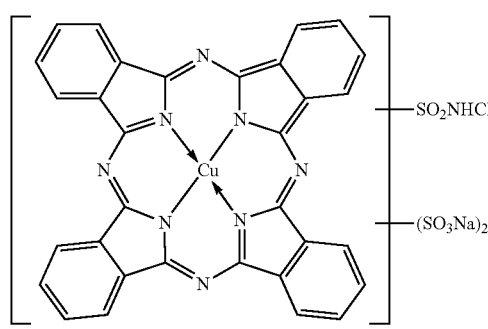

Dye 11-3

Embodiment 12

In embodiment 2, substitute aniline-2,5-disulfate disodium (60 units) with dsodium Amino K acid (i.e. 2-amino-3,6,8-sodium trinaphthalene sulfonate), with same substitution methods and process, it can results in 926 units of mixed dye (Dye12) solution of solid content 16.8%. As HPLC-ESI-MS analyzed, the mixed dye mainly contains Dye12-1, Dye12-2 and Dye12-3. Separation of HPLC preparation obtain pure (negative mode): 326.8, 327.1, 327.4 [(M-8Na+2H)/6], 330.4, 330.8, 331.1 [(M-7Na+H)/6], 392.3, 392.7, 393.1 [(M-8Na+3H)/5], 396.7, 397.1, 397.5 [(M-7Na+2H)/5], 401.1, 401.5, 401.9 [(M-6Na+H)/5], 490.7, 491.2, 491.7 [(M-8Na+4H)/4], 496.2, 496.7, 497.2 [(M-7Na+3H)/4], 501.7, 502.2, 502.7 [(M-6Na+2H)/4], M=2142.7, 2144.7, 2146.7 (isotope). The m/z peaks of Dye12-3 have (negative mode): 336.7 [(M-5Na+H)/4], 342.2 [(M-4Na)/4], 449.3 [(M-5Na+2H)/3], 456.6 [(M-4Na+H)/3], 674.4 [(M-5Na+3H)/2], 685.4 [(M-4Na+2H)/2], 696.4 [(M-3Na+H)/2], M=1460.8.

The HOMO of electron acceptor: −7.11 eV.

Embodiment 13

In embodiment 2, substitute 2-(2-aminoethyl)-p-benzoquinone with 2-(2-aminoethyl)-trichloro-p-benzoquinone (22 units), with same methods and process, it can results in 760 units of mixed dye (Dye13) solution of solid content 10.2%. As HPLC-ESI-MS analyzed, m/z peaks have: 376.2, 375.6 [(M-3Na)/3], 563.9, 564.9 [(M-3Na+H)/2], 574.9, 575.9 [(M-2Na)/2], M=1195.8, 1197.8 (isotope).

The HOMO of electron acceptor: −7.76 eV.

Embodiment 14

In embodiment 2, substitute 2-(2-aminoethyl)-p-benzoquinone with 2-(2-aminoethyl)-p-benzoquinone-dipropylene nitrile (20 units), with same methods and process, it can results in 760 units of mixed dye (Dye14) solution of solid content 10.2%. As HPLC-ESI-MS analyzed, the product is Dye14 (the m/z peaks have: 373.6 [(M-3Na)/3], 560.9 [(M-3Na+H)/2], 571.9 [(M-2Na)/2], M=1189.9).

The HOMO of electron acceptor: −7.36 eV.

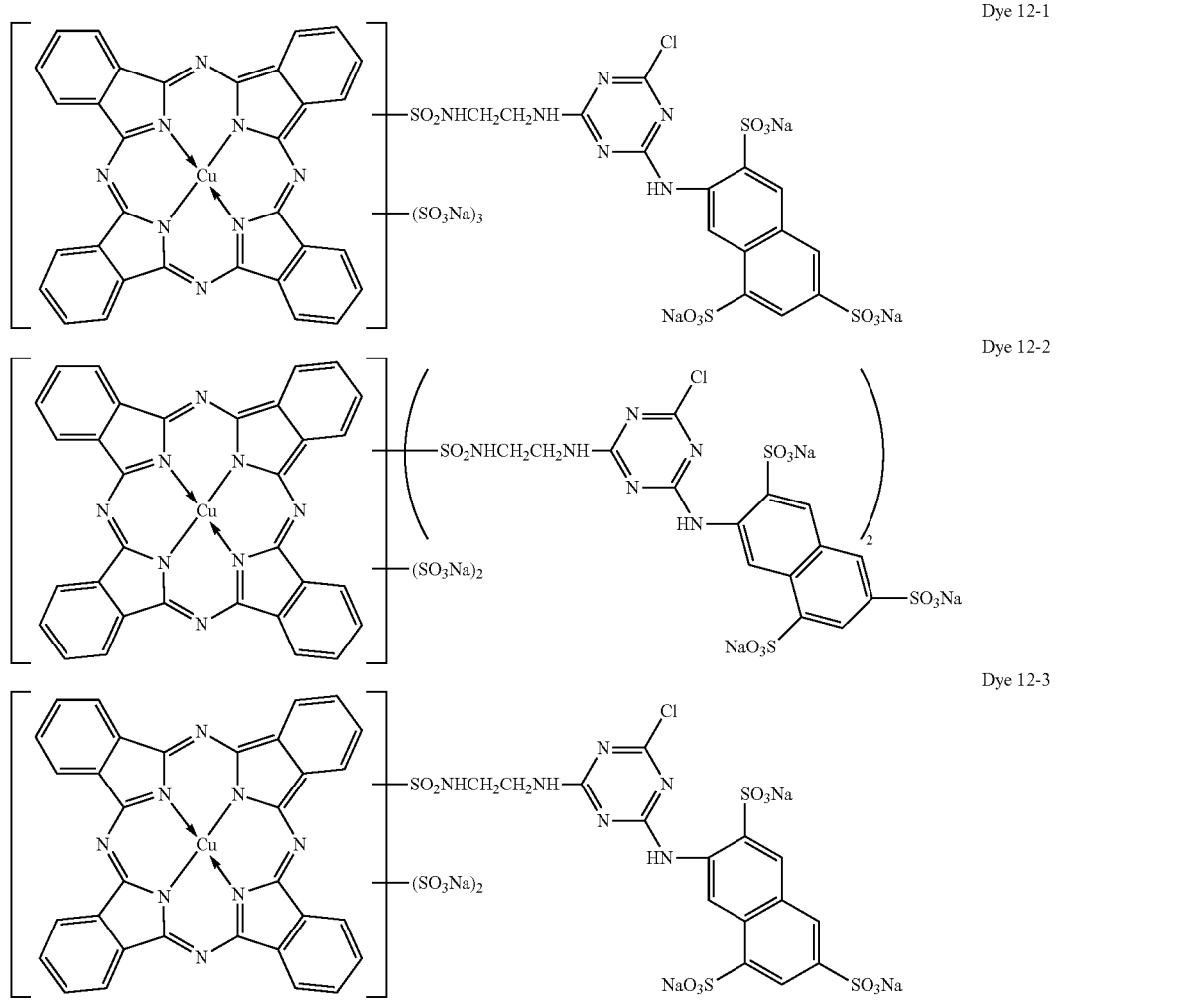

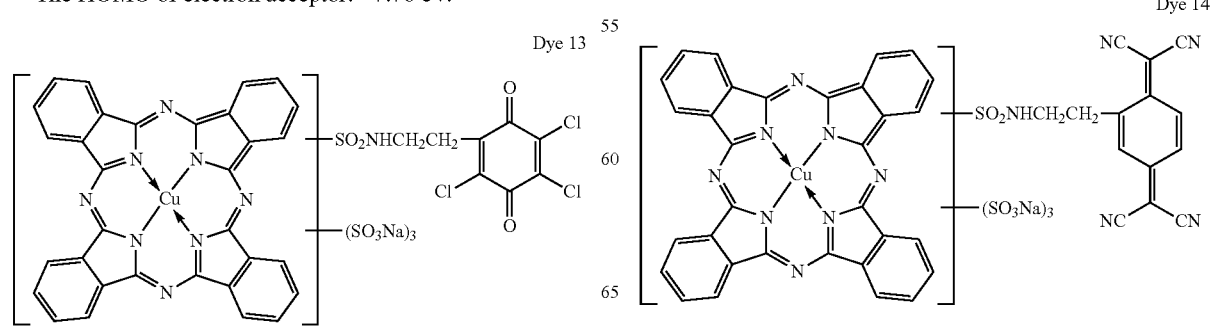

Embodiment 15

Application experiment: prepare inkjet ink with the dyes in the aforementioned various embodiments based on the following recipe:

| | |
|---|---|
| dye: | 5 weight units |
| ethylene glycol: | 4 weight units |
| diethylene glycol: | 4 weight units |
| diethylene glycol monobuthyl ether: | 8 weight units |
| 2-pyrrolidone: | 3 weight units |
| ethanol: | 2 weight units |
| surfactant: | 0.5 weight units |
| germicide: | 0.2 weight units |
| EDTA: | 0.1 weight units |
| pH is adjusted to: | 8-8.5 |

Mix and stir the aforementioned constituents homogeneously at 30-40° C., filter with porous film of average aperture 0.1 μm under atmospheric pressure of 0.2 mpa, resulting in cyan ink.

In the same experimental conditions, substitute the dye of the invention with direct blue 199 to prepare ink for comparison.

Load the aforementioned prepared cyan ink and ink for comparison respectively on the printer of model number C63 purchased from Epson, then spray-print out color blocks onto the high gloss photograph paper purchased from Epson. Test the light-resistance and anti-ozone performances of the printed color blocks.

Light-resistance stability experiment: illuminate for the time as long as recorded in table 1 at room temperature and under a UV light source, then test the color density change of color blocks.

Anti-ozone experiment: lay for the time as long as recorded in table 1 in the 2% ozone atmosphere, constant temperature 25° C., then test the color density change of color blocks.

Test of Color Density Value:

Measure the color density value of color block with conventional densitometer, such as Model WI-QA-1011 densitometer purchased from Zhongshan, Guangdong Rainbow Printer Consumables Co., Ltd. The measurement steps are as below:

power on the densitometer to execute calibration.

put the test-head at the non-printed part of the paper subjected to color density measurement, measure the parameters of the paper; then put the test-head onto the color blocks subjected to color density measurement, the color density of measured color blocks will be automatically displayed on the instrument screen. Repeat the measurement for several times at different parts for one color bock, and take the average.

TABLE 1

Results of dye performance test

| Dye | HOMO of electron acceptor (eV) | Density retention after illumination (%) | | | Density retention under ozone (%) | | |
|---|---|---|---|---|---|---|---|
| | | 0.5 h. | 2 h. | 4 h. | 0.5 h. | 2 h. | 4 h. |
| Dye1 | −7.13 | 99.0 | 98.1 | 94.2 | 92.1 | 85.5 | 80.1 |
| Dye2 | −6.83 | 98.6 | 97.2 | 93.0 | 91.5 | 81.7 | 73.8 |
| Dye3 | −6.83 | 98.6 | 97.7 | 92.8 | 91.6 | 82.2 | 72.6 |
| Dye4 | −6.40 | 97.2 | 94.4 | 88.9 | 88.9 | 79.2 | 69.4 |
| Dye5 | −5.82 | 91.2 | 83.0 | 70.4 | 80.1 | 71.9 | 65.5 |
| Dye6 | −7.35 | 98.3 | 97.3 | 92.8 | 92.0 | 84.0 | 77.3 |
| Dye7 | −7.13 | 99.1 | 98.0 | 93.9 | 92.3 | 86.0 | 81.3 |
| Dye8 | −7.13 | 98.6 | 98.2 | 94.1 | 92.2 | 85.2 | 80.8 |
| Dye9 | −7.13 | 99.1 | 98.0 | 93.5 | 92.2 | 85.6 | 81.2 |
| Dye9' | −7.13 | 99.3 | 98.3 | 94.2 | 91.8 | 85.1 | 81.2 |
| Dye9" | −7.13 | 99.2 | 97.4 | 94.4 | 92.3 | 85.4 | 80.9 |
| Dye2' | −7.13 | 99.0 | 98.2 | 93.3 | 92.1 | 84.4 | 80.0 |
| Dye2" | −7.13 | 98.8 | 98.8 | 94.0 | 92.0 | 83.9 | 79.9 |
| Dye11 | −6.48 | 97.3 | 94.5 | 89.0 | 89.3 | 80.0 | 70.3 |
| Dye12 | −7.11 | 98.1 | 98.2 | 90.2 | 91.0 | 85.0 | 80.1 |
| Dye13 | −7.76 | 98.0 | 97.9 | 90.0 | 90.9 | 85.1 | 80.0 |
| Dye14 | −7.36 | 98.2 | 97.8 | 92.0 | 91.5 | 84.8 | 78.4 |
| Direct blue 199 | | 89.4 | 77.3 | 68.2 | 63.6 | 47.0 | 37.9 |

It is obvious from the data in the table, the ink prepared from the dye of the invention has significant improvement over the dye direct blue 199 of existing technology in light-resistance or anti-ozone performance whatever.

For the convenience of operation, the dyes (Dye1-14) of various embodiments used in table 1 all directly use the mixture of the dye compound synthesized in various embodiments, the ink being directly prepared without separation of the mixture into single compound. For example, Dye1 is the mixture of Dye1-1 and Dye1-2, Dye2 is the mixture of Dye2-1, Dye2-2 and Dye2-3, and so on.

In addition, the applicant has performed advance separation of the compound mixtures synthesized in various embodiments, then prepares ink using the separated single pure compound, followed by respective test. It is discovered that light-resistance and anti-ozone performance of the ink prepared with pure compound are same as the corresponding ink prepared with mixture thereof. Specifically, the ink prepared by Dye1-1 or Dye-2 as dyes in the embodiment 1 has same light-resistance, anti-ozone performances as the ink prepared by Dye1 as mixed dye. The ink prepared by any one of Dye2-1 or Dye2-1 or Dye 2-3 has same performances as the ink prepared by Dye2 as mixed dye. So do the dyes in other various embodiments.

We claim:

1. A weather-resistant dye, characterized in that the dye contains in molecules thereof not only chromophoric parent D, but also electron-accepting group Q which is connected with dye parent D through non-conjugated carbon link L to constitute D-L-Q dye molecule;

said dye includes cyan dye, said cyan dye comprises compound of general formula I or mixture thereof:

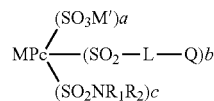
I wherein MPc is chromophoric donating group D as phthalocyanine parent, L is the non-conjugated linking group, Q is the electron-accepting group, the HOMO energy level of Q is lower than the HOMO energy level of the dye chromophoric parent D;

in the general formula I, a and c are the same or different integer of 0-3, b is an integer of 1-4, the sum of a+b+c is 2-4;

M in the MPc phthalocyanine parent is hydrogen atom, metal atom or oxide, hydroxyl compound or halide thereof, Pc is phthalocyanine parent ring;

$R_1$ and $R_2$ are the same or different H, alkyl of $C_{1-18}$, aryl of $C_{6-12}$, phenyl or naphthyl with substituent A, or $(CR_3R_4)_nA$, $R_3$ and $R_4$ are the same or different H or alkyl of $C_{1-4}$; A is H, OH, $NH_2$, $CO_2M''$ or $SO_3M''$, n is 1-18;

M' and M" are the same or different H, metal ion selected from the group consisting of Na, K, and Li, ammonium salt $NH_4$, and organic ammonium salt selected from the group consisting of $N(CH_4)$, $NH(CH_3)$, $NH_2(CH_2)$, $NH_3(CH_3)$, $NH(CH_2CH_2OH)_3$, $NH_2(CH_2CH_2OH)_2$ and $NH_3CH_2CH_2OH$;

L is $-NR_3(CR_4R_5)_mNR_6-$ or $-NR_3(CR_4R_5)_m-$, wherein $R_5$ and $R_6$ are the same or different H or alkyl of $C_{1-4}$; m is the same or different integer 1-4;

Q has general formula $Q_2$;

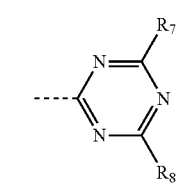
$Q_1$

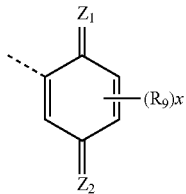
$Q_2$ $R_9$ is H, Cl, Br, CN, $CF_3$, $CH_3$, $SO_3M''$ or $CO_2M''$;
x is integer of 0-3; and
$Z_1$ and $Z_2$ are the same or different O or $C(CN)_2$.

2. The dye as claimed in claim 1,
wherein the difference of HOMO energy level value between said group Q and the dye chromophoric parent D≥0.1.

3. The dye as claimed in claim 1,
wherein said MPc is copper phthalocyanine with general formula III:

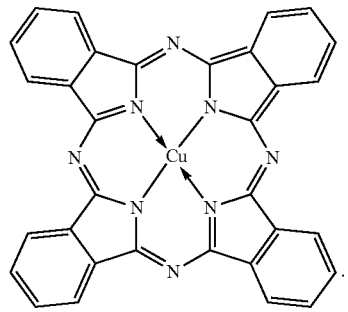
III

4. The dye as claimed in claim 1,
wherein said general formula I compound is the compound of general formula V:

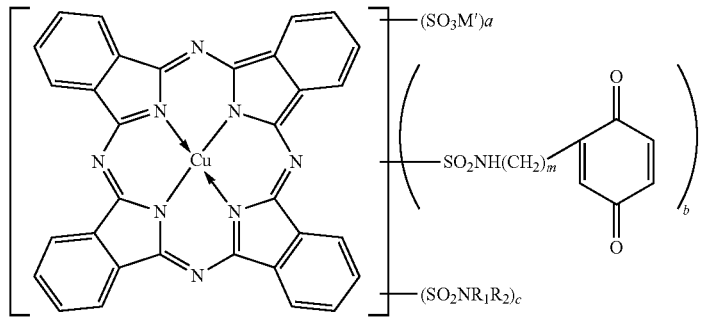
V in the general formula V, groups M', $R_1$, $R_2$, a, b, c, m are defined same as in claim 1.

5. A water-based inkjet ink composition, comprising:
1-20 weight percent of the dye claimed in claim 1, 5-50 weight percent of an organic solvent miscible with water and 30-94 weight percent of water, based on total weight of the composition.

6. The dye as claimed in claim 1, which is utilized as colorant in the following materials:

ink, dope, lacquer, toner powder for laser printing, marker, paper, fabric, glass, porcelain or polymer.

7. The dye as claimed in claim 1,
wherein the difference of HOMO energy level value between said group Q and the dye chromophoric parent D≥0.2.

8. The dye as claimed in claim 1,
wherein said L group is —$NR_3(CR_4R_5)_mNR_6$—.

* * * * *